United States Patent
Okunishi et al.

(10) Patent No.: US 9,932,920 B2
(45) Date of Patent: Apr. 3, 2018

(54) CONTROL DEVICE FOR INTERNAL COMBUSTION ENGINE

(71) Applicant: HONDA MOTOR CO., LTD., Tokyo (JP)

(72) Inventors: Shinichi Okunishi, Wako (JP); Ken Ogawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/204,997

(22) Filed: Jul. 8, 2016

(65) Prior Publication Data

US 2017/0009682 A1 Jan. 12, 2017

(30) Foreign Application Priority Data

Jul. 10, 2015 (JP) .................................. 2015-138597
Dec. 10, 2015 (JP) .................................. 2015-241446

(51) Int. Cl.
*F02D 41/00* (2006.01)
*F01P 3/20* (2006.01)
(Continued)

(52) U.S. Cl.
CPC ............ *F02D 41/0072* (2013.01); *F01P 3/20* (2013.01); *F01P 11/16* (2013.01); *F02D 35/023* (2013.01);
(Continued)

(58) Field of Classification Search
CPC ............ F02D 41/1486; F02D 41/0097; F02D 41/1458; F02D 41/34; F02D 41/0007;
(Continued)

(56) References Cited

U.S. PATENT DOCUMENTS

2006/0150953 A1* 7/2006 Moriya ................... F02D 41/40
123/435
2016/0312727 A1* 10/2016 Nakasaka ........... F02D 41/0085
(Continued)

FOREIGN PATENT DOCUMENTS

JP 2008-231995 10/2008
JP 4803100 B2 11/2008

OTHER PUBLICATIONS

Office Action with Form PTO-892 Notice of References Cited issued by the United States Patent and Trademark Office for the co-pending U.S. Appl. No. 15/204,998, dated Jul. 6, 2017.

*Primary Examiner* — John Kwon
*Assistant Examiner* — Johnny H Hoang
(74) *Attorney, Agent, or Firm* — Mori & Ward, LLP

(57) ABSTRACT

A control device includes a cylinder pressure sensor, a driving condition detector, a reference crank angle setter, a reference cylinder pressure calculator, an EGR ratio estimator, and a controller. The cylinder pressure sensor detects a cylinder pressure inside a cylinder. The driving condition detector detects a driving condition in an internal combustion engine. The reference crank angle setter calculates, according to the driving condition, a reference crank angle immediately before which mixture gas starts combusting. The reference cylinder pressure calculator calculates a reference cylinder pressure at the reference crank angle based on temperature characteristics of a heat capacity ratio of the mixture gas under a condition. The EGR ratio estimator calculates an EGR ratio based on a pressure difference between the reference cylinder pressure and the cylinder pressure at the reference crank angle. The controller controls the internal combustion engine according to the EGR ratio.

17 Claims, 14 Drawing Sheets

(51) Int. Cl.
*F02D 35/02* (2006.01)
*F01P 11/16* (2006.01)

(52) U.S. Cl.
CPC ......... *F02D 35/025* (2013.01); *F02D 35/028* (2013.01); *F02D 41/009* (2013.01); *Y02T 10/47* (2013.01)

(58) Field of Classification Search
CPC ............. F02D 35/024; F02D 2200/023; F02D 2041/001; F02D 2041/1409; F02D 2041/1433; F02M 47/00; Y02T 10/16; Y02T 10/44
USPC .................. 123/435, 568.11, 568.17, 559.1; 701/102–105, 108
See application file for complete search history.

(56) References Cited

U.S. PATENT DOCUMENTS

| | | |
|---|---|---|
| 2017/0009682 A1 | 1/2017 | Okunishi et al. |
| 2017/0009688 A1* | 1/2017 | Okunishi ............ F02D 41/1486 |

* cited by examiner

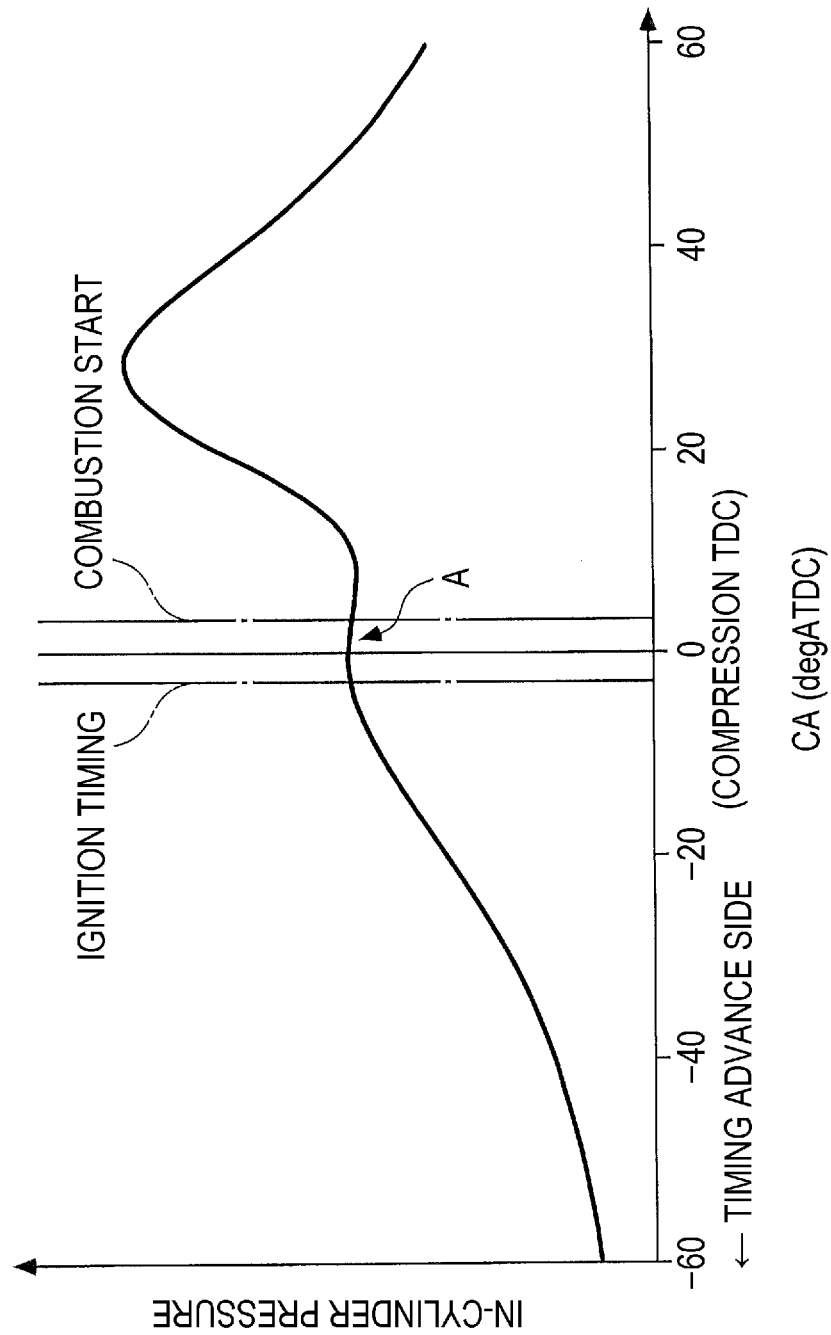

CONTROL DEVICE FOR INTERNAL COMBUSTION ENGINE

CROSS-REFERENCE TO RELATED APPLICATIONS

The present application claims priority under 35 U.S.C. § 119 to Japanese Patent Application No. 2015-138597, filed Jul. 10, 2015, entitled "Control Device for Internal Combustion Engine" and Japanese Patent Application No. 2015-241446, filed Dec. 10, 2015, entitled "Control Device for Internal Combustion Engine." The contents of these applications are incorporated herein by reference in their entirety.

BACKGROUND

1. Field

The present disclosure relates to a control device for an internal combustion engine.

2. Description of the Related Art

There has been known a conventional EGR ratio estimating method which involves detecting an amount of fresh air to be taken into a cylinder by an airflow sensor, calculating a total amount of gas to be taken into the cylinder based on an intake pressure detected by an intake pressure sensor, and estimating an EGR ratio from the amount of fresh air and the total amount of gas. In the case of using this estimating method for a low-pressure EGR device (EGR device which takes in an exhaust gas from a downstream side of a turbine of a turbocharger and recirculates the exhaust gas back to an upstream side of a compressor in an intake passage), however, it is difficult to estimate the EGR ratio with high accuracy because the external EGR gas needs to flow a relatively long passage leading to the cylinder, and accordingly reaches the inside of the cylinder with a long time lag.

As another conventional EGR ratio estimating method, a method disclosed in Japanese Unexamined Patent Application Publication No. 2008-231995 has been known, for example. This estimating method is based on the assumption that a state change of a mixture gas in a compression stroke of the internal combustion engine is a polytropic change, and that a heat capacity ratio of the mixture gas varies depending on its composition. More specifically, an in-cylinder pressure sensor detects in-cylinder pressures P1, P2 at two predetermined crank angles CA1, CA2 in the compression stroke, and a heat capacity ratio κ of the mixture gas is calculated from the in-cylinder pressures P1, P2 and cylinder volumes V1, V2 corresponding to the crank angles CA1, CA2 in accordance with the following formula:

$$\kappa = \log(P1/P2)/\log(V2/V1).$$

Then, the EGR ratio is calculated based on the calculated heat capacity ratio κ by referring to a predetermined table in which a relationship between the heat capacity ratio and the EGR ratio (EGR gas concentration) is defined.

SUMMARY

According to one aspect of the present invention, a control device for an internal combustion engine including an EGR device that, concurrently with direct injection of a fuel into a cylinder, recirculates a portion of an exhaust gas discharged to an exhaust passage from the cylinder back to an intake passage as an external EGR gas, the control device includes an in-cylinder pressure sensor, a driving condition detector, a reference crank angle setter, a reference in-cylinder pressure calculator, an EGR ratio estimator, and a controller. The in-cylinder pressure sensor detects a pressure inside the cylinder as an in-cylinder pressure. The driving condition detector detects a driving condition of the internal combustion engine. The reference crank angle setter obtains a crank angle immediately before start of combustion of a mixture gas charged in the cylinder depending on the detected driving condition of the internal combustion engine, and sets the obtained crank angle as a reference crank angle. The reference in-cylinder pressure calculator calculates, as a reference in-cylinder pressure, a pressure inside the cylinder expected to occur at the set reference crank angle, based on a temperature property of a heat capacity ratio of the mixture gas under conditions that the mixture gas contains no external EGR gas and is at a stoichiometric air-fuel ratio. The EGR ratio estimator estimates an EGR ratio based on a pressure difference between an actual in-cylinder pressure detected at the reference crank angle by the in-cylinder pressure sensor, and the calculated reference in-cylinder pressure. The controller controls the internal combustion engine according to the estimated EGR ratio.

According to another aspect of the present invention, a control device for an internal combustion engine, the control device includes a cylinder pressure sensor, a driving condition detector, a reference crank angle setter, a reference cylinder pressure calculator, an EGR ratio estimator, and a controller. The cylinder pressure sensor detects a cylinder pressure inside a cylinder into which fuel is directly injected. The driving condition detector detects a driving condition in the internal combustion engine. The reference crank angle setter calculates, according to the driving condition detected by the driving condition detector, a reference crank angle immediately before which mixture gas starts combusting in the cylinder. The reference cylinder pressure calculator calculates a reference cylinder pressure in the cylinder at the reference crank angle based on temperature characteristics of a heat capacity ratio of the mixture gas under a condition that the mixture gas contains no external EGR gas and that the mixture gas has a stoichiometric air-fuel ratio. The EGR ratio estimator calculates an EGR ratio based on a pressure difference between the reference cylinder pressure and the cylinder pressure detected by the cylinder pressure sensor at the reference crank angle. The controller controls the internal combustion engine according to the EGR ratio.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 20 is a diagram illustrating an example of relationship between a crank angle and an actual in-cylinder pressure around a compression TDC.

DESCRIPTION OF THE EMBODIMENT

Figure 1:
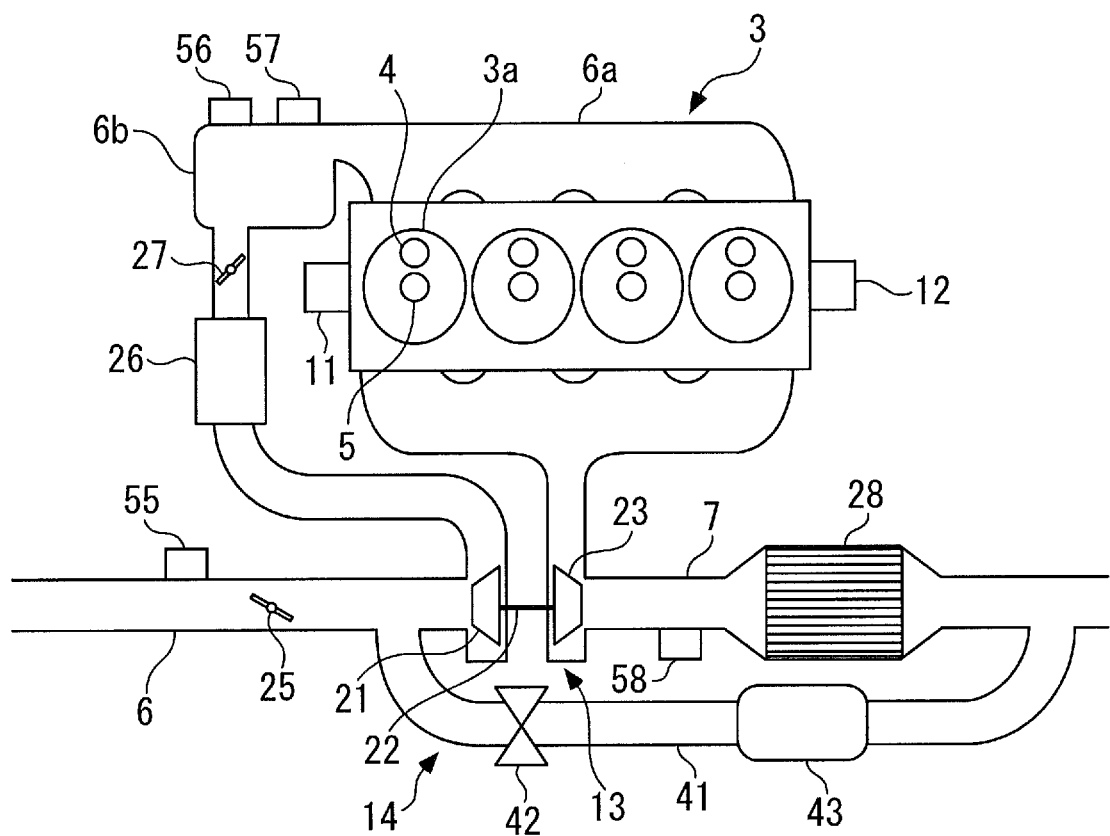
FIG. 1 is a diagram schematically illustrating a configuration of an internal combustion engine to which the present disclosure is applied.

The embodiments will now be described with reference to the accompanying drawings, wherein like reference numerals designate corresponding or identical elements throughout the various drawings.

Hereinafter, a preferable embodiment of the present disclosure is described in detail with reference to the drawings. As illustrated in FIG. 1, an internal combustion engine (hereinafter, referred to as "engine") 3 to which the present disclosure is applied is a gasoline engine including, for example, four cylinders 3a, and is mounted as a power source on a vehicle (not illustrated).

Figure 2:
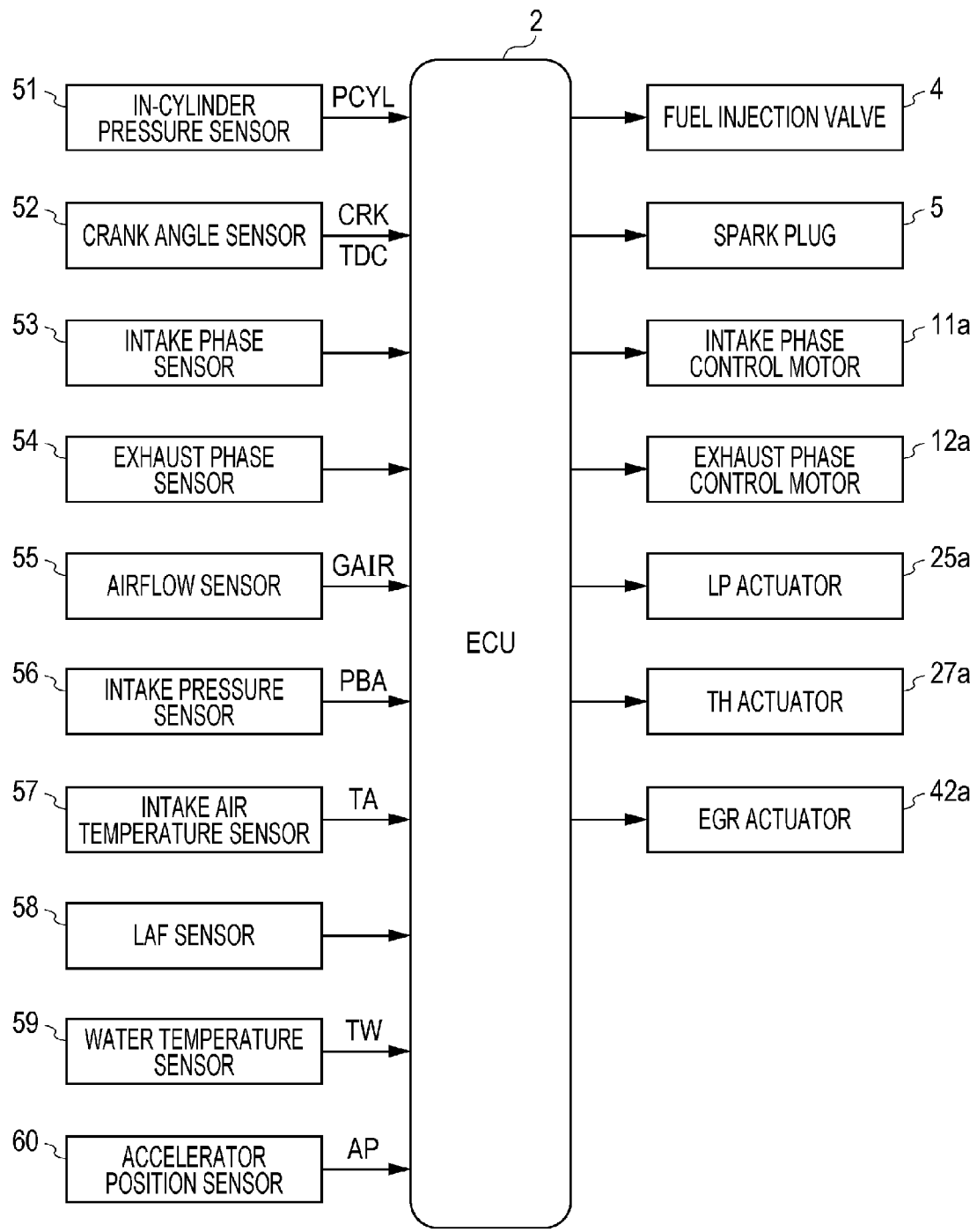
FIG. 2 is a block diagram illustrating a schematic configuration of a control device.

Each of the cylinders 3a of the engine 3 is provided with a fuel injection valve (hereinafter, referred to as "injector") 4 and a spark plug 5 which face a combustion chamber (not illustrated) of the cylinder 3a. The injector 4 is of a type of directly injecting the fuel into the combustion chamber. Upon electric spark from the spark plug 5, the mixture gas of the fuel and the air is ignited and combusted. The fuel injection amount and the fuel injection timing from the injector 4 and the ignition timing IGLOG of the spark plug 5 are controlled in accordance with control signals from an electronic control unit (hereinafter, referred to as "ECU") 2 (see FIG. 2).

Here, the "mixture gas" in this embodiment is an in-cylinder gas charged in the cylinder 3a and used for combustion, and contains an external exhaust gas recirculation (external EGR) gas in the case where an EGR device 14 described later performs external EGR.

Each of the cylinders 3a of the engine 3 is provided with an in-cylinder pressure sensor 51 which detects a pressure inside the cylinder 3a (in-cylinder pressure). In this embodiment, the in-cylinder pressure sensor 51 is a built-in sensor in the injector. Thus, a pressure detection element which faces the combustion chamber and picks up the in-cylinder pressure, an amplifier circuit which amplifies signals from the pressure detection element, and others are assembled and integrated into the injector 4, although not illustrated. A detection signal indicating an in-cylinder pressure PCYL detected by the in-cylinder pressure sensor 51 is inputted to the ECU 2.

In addition, the engine 3 includes a variable intake phase mechanism 11, a variable exhaust phase mechanism 12, a turbocharger 13, the EGR device 14, and so forth.

The variable intake phase mechanism 11 varies a relative phase CAIN of an intake valve (not illustrated) with respect to a crankshaft (not illustrated) of the engine 3 (hereinafter, such phase is referred to as "intake phase") steplessly, and includes an intake phase control motor 11a (see FIG. 2) and others. In accordance with a control signal from the ECU 2, the intake phase control motor 11a rotates an intake camshaft (not illustrated) relative to the crankshaft to change a relative angle between the two, and thereby varies the intake phase CAIN steplessly.

Similarly, the variable exhaust phase mechanism 12 varies a relative phase CAEX of an exhaust valve (not illustrated) with respect to the crankshaft of the engine 3 (hereinafter, such phase is referred to as "exhaust phase") steplessly, and includes an exhaust phase control motor 12a (see FIG. 2) and others. In accordance with a control signal from the ECU 2, the exhaust phase control motor 12a rotates an exhaust camshaft (not illustrated) relative to the crankshaft to change a relative angle between the two, and thereby varies the exhaust phase CAEX steplessly.

These variable intake phase mechanism 11 and variable exhaust phase mechanism 12 are used to vary the intake phase CAIN and the exhaust phase CAEX, respectively, thereby controlling the valve open-close timings of the intake valve and the exhaust valve, and also controlling internal EGR with valve overlap in which the intake valve and the exhaust valve are both open.

The turbocharger 13 includes a compressor 21 provided in an intake passage 6 and a turbine 23 provided in an exhaust passage 7 and integrally coupled to the compressor 21 via a shaft 22. When the turbine 23 is driven by the exhaust gas flowing through the exhaust passage 7, the compressor 21 rotates integrally with the turbine 23 and thereby turbocharges the intake air. Meanwhile, a boost pressure is adjusted by controlling a wastegate valve (not illustrated) and so forth in accordance with a control signal from the ECU 2.

In the intake passage 6, an intake throttle valve 25, the compressor 21 of the turbocharger 13, an inter cooler 26 which cools the intake air with a temperature increased by turbocharging, and a throttle valve 27 are provided in this order from the upstream side of the intake air. The intake throttle valve 25 generates a negative pressure to introduce the external EGR gas to the downstream side of the intake throttle valve 25, and the valve lift of the intake throttle valve 25 is controlled by means of an LP actuator 25a in accordance with a control signal from the ECU 2.

The throttle valve 27 is disposed upstream of an intake manifold 6a of the intake passage 6. The valve lift of the throttle valve 27 is controlled by means of a TH actuator 27a in accordance with a control signal from the ECU 2, and thereby an amount of in-cylinder gas to be taken into the cylinder 3a is controlled.

A three way catalyst 28 is provided downstream of the turbine 23 of the exhaust passage 7. The three way catalyst 28 in an active status purifies the exhaust gas by oxidizing HC and CO and also reducing $NO_x$ in the exhaust gas.

The EGR device 14 recirculates a portion of the exhaust gas, which is discharged from the cylinders 3a to the exhaust passage 7, as an external EGR gas back to the intake passage 6 via an EGR passage 41. As illustrated in FIG. 1, the EGR passage 41 is connected to the exhaust passage 7 at a position downstream of the turbine 23 and the three way catalyst 28 and is connected to the intake passage 6 at a position between the compressor 21 and the intake throttle valve 25. With this structure, the external EGR gas is taken out of the exhaust gas after driving of the turbine 23, and accordingly has a relatively low pressure. In other words, the EGR device 14 is configured as what is termed as a low-pressure EGR device.

In the middle of the EGR passage 41, an EGR valve 42 and an EGR cooler 43 which cools the external EGR gas are provided. The valve lift of the EGR valve 42 is controlled by means of an EGR actuator 42a in accordance with a control signal from the ECU 2, and thereby the amount of the external EGR gas is controlled.

In addition, the engine 3 is provided with the following various sensors (see FIG. 2) in addition to the aforementioned in-cylinder pressure sensor 51 in order to detect driving conditions of the engine 3.

Along with rotation of the crankshaft, a crank angle sensor 52 outputs pulse signals called a CRK signal and a TDC signal to the ECU 2 at every predetermined respective crank angles. The CRK signal is outputted at every predetermined crank angle (for example, 0.5 degrees). The ECU 2 calculates the number NE of revolutions of the engine 3 (hereinafter, referred to as "number of engine revolutions") based on the CRK signal.

Meanwhile, the TDC signal is a signal indicating that a piston (not illustrated) of the engine 3 is located at a predetermined crank angle position near an intake top dead center (TDC) in any of the cylinders 3a, and is outputted at every 180 degrees of the crank angle in the case where the engine 3 is a four-cylinder engine as in this embodiment. From the TDC signal and the CRK signal, the ECU 2 calculates the crank angle CA on the basis of the output timing of the TDC signal for each of the cylinders 3a. In addition, from the TDC signal and the CRK signal, The ECU 2 calculates a crank angle stage FISTG (=0 to 23) at every predetermined crank angle (for example, 30 degrees) and assigns the calculated stage FISTG.

Moreover, the intake camshaft to which the variable intake phase mechanism 11 is attached, and the exhaust camshaft to which the variable exhaust phase mechanism 12 is attached are provided with an intake phase sensor 53 and an exhaust phase sensor 54, respectively. Along with rotation of the intake camshaft, the intake phase sensor 53 outputs a pulse signal called a CAMIN signal to the ECU 2 at every predetermined cam angle (for example, 0.5 degrees). The ECU 2 calculates the intake phase CAIN based on the CAMIN signal and the CRK signal. Similarly, along with rotation of the exhaust camshaft, the exhaust phase sensor 54 outputs a pulse signal called a CAMEX signal to the ECU 2 at every predetermined cam angle (for example, 0.5 degrees). The ECU 2 calculates the exhaust phase CAEX based on the CAMEX signal and the CRK signal.

In addition, in the intake passage 6, an airflow sensor 55 is provided upstream of the intake throttle valve 25, and an intake pressure sensor 56 and an intake air temperature sensor 57 are provided in an intake chamber 6b located downstream of the throttle valve 27. The airflow sensor 55 detects an amount GAIR of air (fresh air) to be taken into the cylinders 3a (intake air amount), the intake pressure sensor 56 detects an absolute pressure of an intake pressure PBA, and the intake air temperature sensor 57 detects a temperature TA of intake air which contains the external EGR gas and is to be taken into the cylinders 3a (intake air temperature). These detection signals are inputted to the ECU 2.

An LAF sensor 58 is provided between the turbine 23 and the three way catalyst 28 in the exhaust passage 7. The LAF sensor 58 successively detects an oxide concentration in the exhaust gas to flow into the three way catalyst 28 in a wide air-fuel ratio range including a stoichiometric ratio, and outputs the detection signal to the ECU 2. The ECU 2 calculates an equivalent ratio KACT of the exhaust gas based on this detection signal.

Further, the ECU 2 receives a detection signal indicating a temperature TW of cooling water which cools the engine 3 (hereinafter, referred to as "engine water temperature") from a water temperature sensor 59, and a detection signal indicating a press-down amount AP of an accelerator pedal (not illustrated) of the vehicle (hereinafter, referred to as "accelerator position") from an accelerator position sensor 60.

The ECU 2 is formed of a microcomputer including a CPU, a RAM, a ROM, an I/O interface, and others (all of which are not illustrated). The ECU 2 determines the driving conditions of the engine 3 based on the detection signals and others from the various sensors described above, and performs engine control including control of the fuel injection amount of the injector 4, the ignition timing IGLOG of the spark plug 5, and the like.

In this embodiment, the ECU 2 estimates an EGR ratio R_EGR of the mixture gas charged in each of the cylinders 3a, and controls the ignition timing IGLOG based on the estimated EGR ratio R_EGR, in particular. It should be noted that the EGR ratio R_EGR of the mixture gas is defined as a ratio of the EGR gas amount to the total amount of the mixture gas (in-cylinder gas).

In this embodiment, the ECU 2 serves as a reference crank angle setter, a reference in-cylinder pressure calculator, an EGR ratio estimator, a controller, an initial crank angle acquirer, and an initial in-cylinder temperature acquirer.

Figure 3:
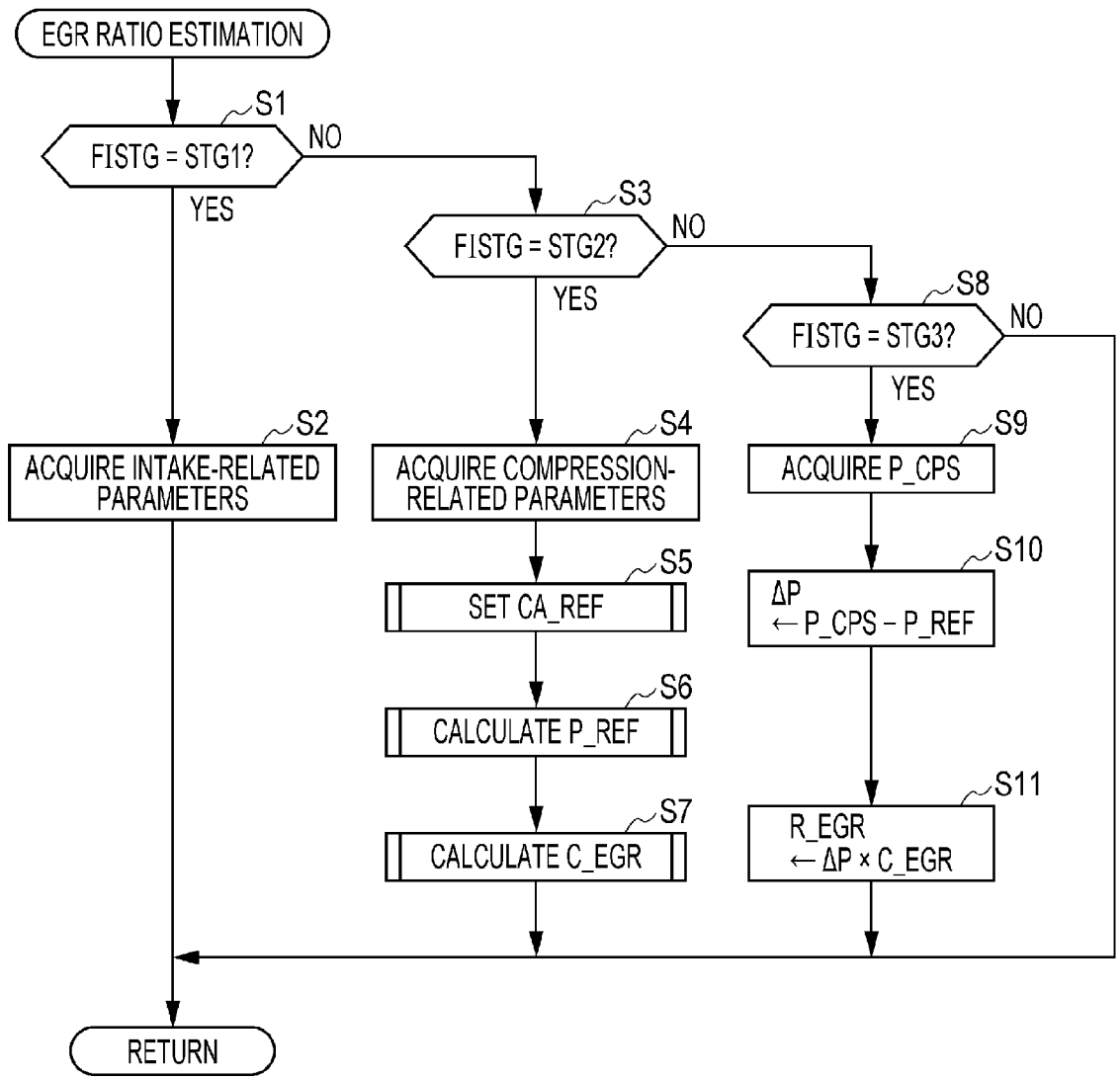
FIG. 3 demonstrates a main flow of estimation processing of an EGR ratio.

FIG. 3 demonstrates a main flow of estimation processing of an EGR ratio R_EGR executed by the ECU 2. This processing is executed for each of the cylinders 3a and repeated in the same cycles as cycles of switching the aforementioned crank angle stages FISTG from one to another (for example, at every 30 degrees of the crank angle). Here, processing directly related to the in-cylinder pressure PCYL detected by the in-cylinder pressure sensor 51 is executed independently of this estimation processing in the same cycles as the generation cycles of the CRK signal (for example, at every 0.5 degrees of the crank angle), and the detected in-cylinder pressure PCYL is stored while being associated with the crank angle CA, for example.

In the estimation processing of FIG. 3, firstly in step 1 (denoted by "S1" in FIG. 3; the same applies to the following steps), the ECU 2 determines whether or not the crank angle stage FISTG is equal to a first predetermined value STG1 corresponding to an intake top dead center (TDC). If the determination result is YES and the concerned cylinder 3a is in a stage immediately after a shift to an intake stroke, the ECU 2 acquires intake-related parameters (step 2). Specifically, the intake air temperature TA, the engine water temperature TW, and the exhaust phase CAEX are read as the intake-related parameters, and stored into a predetermined area in the RAM of the ECU 2. Then, the ECU 2 terminates this processing.

If the determination result in above step 1 is NO, the ECU 2 determines whether or not the crank angle stage FISTG is equal to a second predetermined value STG2 corresponding to a compression bottom dead center (BDC) (step 3). If the determination result is YES and the concerned cylinder 3a is in a stage immediately after a shift to a compression stroke, the ECU 2 acquires compression-related parameters (step 4). Specifically, the intake pressure PBA, the number of engine revolutions NE, and the intake phase CAIN detected, and the ignition timing IGLOG set at this time point are read as the compression-related parameters, and stored into a predetermined area in the RAM of the ECU 2.

Figure 4:
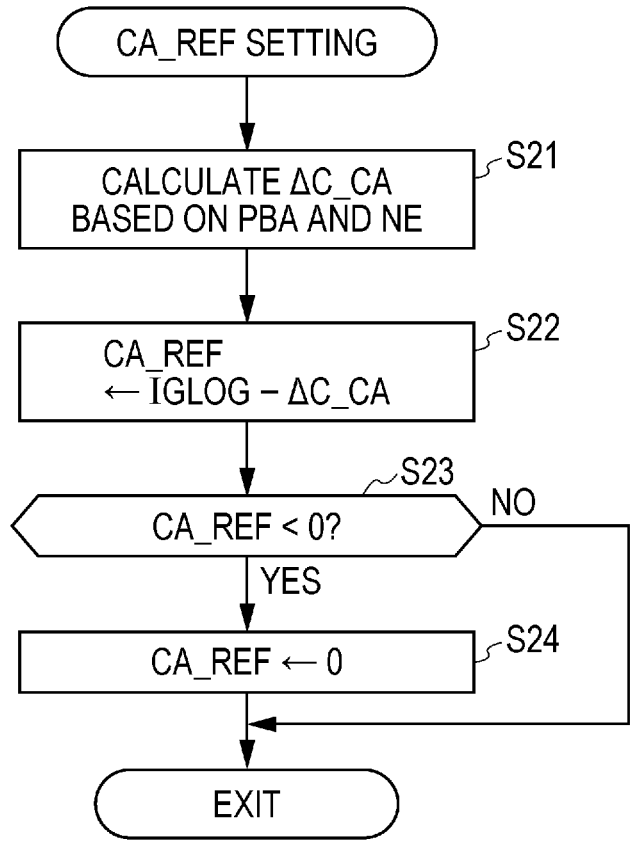
FIG. 4 demonstrates a sub-routine of setting processing of a reference crank angle.

Next, the ECU 2 executes setting processing of a reference crank angle CA_REF (step 5). This setting processing involves predicting a timing immediately before the start of combustion of the mixture gas, and setting the predicted timing as the reference crank angle CA_REF. FIG. 4 demonstrates a sub-routine of this setting processing.

In this setting processing, firstly in step 21, the ECU 2 calculates a retard correction amount $\Delta C\_CA$ by searching a predetermined map (not illustrated) based on the intake pressure PBA and the number of engine revolutions NE detected in foregoing step 4. The retard correction amount $\Delta C\_CA$ is equivalent to a combustion time lag until the ignited mixture gas starts combustion after the ignition operation by the spark plug 5 at the ignition timing IGLOG, and is expressed in degrees of the crank angle. The lower the intake pressure PBA, the later the mixture gas starts combustion. Then, the higher the number of engine revolutions NE, the larger the crank angle corresponding to the same combustion time lag. For these reasons, the retard correction amount $\Delta C\_CA$ in the aforementioned map is set to become larger as the intake pressure PBA becomes lower and as the number of engine revolutions NE becomes higher.

Then, the ECU 2 sets the reference crank angle CA_REF to a value obtained by subtracting the retard correction amount $\Delta C\_CA$ from the ignition timing IGLOG acquired in above step 4 (step 22). Here, the reference crank angle CA_REF is expressed in degrees with the origin (0 degrees) set at the compression TDC of each cylinder 3a while an angle on the timing-advance side is expressed in positive degrees (see FIG. 10).

Next, the ECU 2 determines whether or not the set reference crank angle CA_REF is smaller than 0 degrees corresponding to the compression TDC (step 23). If the determination result is NO, in other words, if the reference crank angle CA_REF is equivalent to the compression TDC or is on the timing-advance side of the compression TDC, the ECU 2 just terminates this processing.

On the other hand, if the determination result in step 23 is YES, and the reference crank angle CA_REF is on the timing-retard side of the compression TDC, the ECU 2 restricts the reference crank angle CA_REF to 0 degrees corresponding to the compression TDC (step 24), and terminates this processing.

Returning to FIG. 3, in step 6 following step 5 described above, the ECU 2 executes calculation processing of a reference in-cylinder pressure P_REF. This reference in-cylinder pressure P_REF is an in-cylinder pressure expected to occur at the aforementioned reference crank angle under the conditions that the mixture gas contains no external EGR gas, and is at the stoichiometric air-fuel ratio. The calculation processing thereof will be described later in detail.

Figure 5:
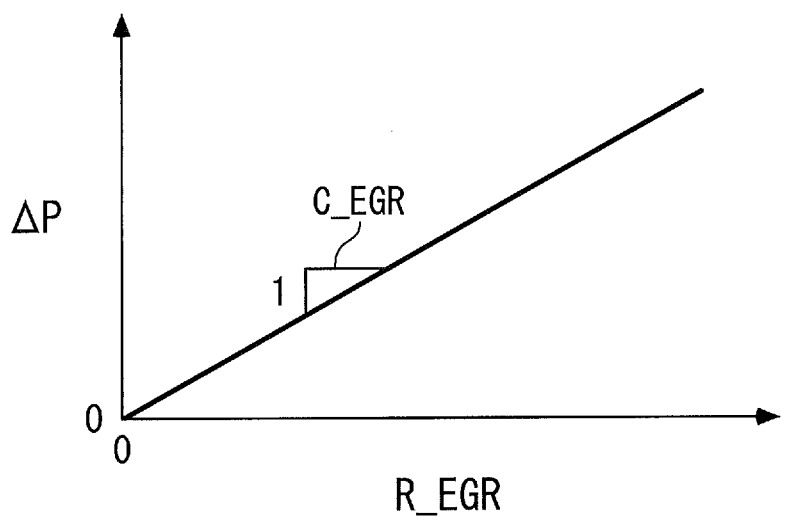
FIG. 5 is a diagram illustrating a relationship between an EGR ratio and a pressure difference between an actual in-cylinder pressure and a reference in-cylinder pressure.

Thereafter, the ECU 2 executes calculation processing of the EGR coefficient C_EGR (step 7), and terminates this processing. Since the EGR ratio R_EGR and a pressure difference $\Delta P$ (a difference between an actual in-cylinder pressure P_CPS described later and the reference in-cylinder pressure P_REF) are found to have a linear (proportional) relationship therebetween as illustrated in FIG. 5, the EGR coefficient C_EGR is defined as a slope ($=R\_EGR/\Delta P$) of the line representing the relationship. The calculation processing thereof will be described later in detail.

If the determination result in foregoing step 3 is NO, the ECU 2 determines whether or not the crank angle stage FISTG is equal to a third predetermined value STG3 corresponding to a compression top dead center (TDC) (step 8). If the determination result is NO, the ECU 2 just terminates the estimation processing. On the other hand, if the determination result is YES and the concerned cylinder 3a is in a stage immediately after the end of the compression stroke, the ECU 2 reads the in-cylinder pressure PCYL detected at the reference crank angle CA_REF set in step 5 from the RAM, and thereby acquires the read in-cylinder pressure PCYL as an actual in-cylinder pressure P_CPS (step 9).

Next, the ECU 2 calculates a difference between the acquired actual in-cylinder pressure P_CPS and the reference in-cylinder pressure P_REF calculated in step 6 ($=P\_CPS-P\_REF$) (step 10). Then, the ECU 2 multiplies the calculated pressure difference $\Delta P$ by the EGR coefficient C_EGR calculated in step 7 to thereby calculate the EGR ratio R_EGR of the mixture gas (step 11), and terminates the estimation processing.

Figure 6:
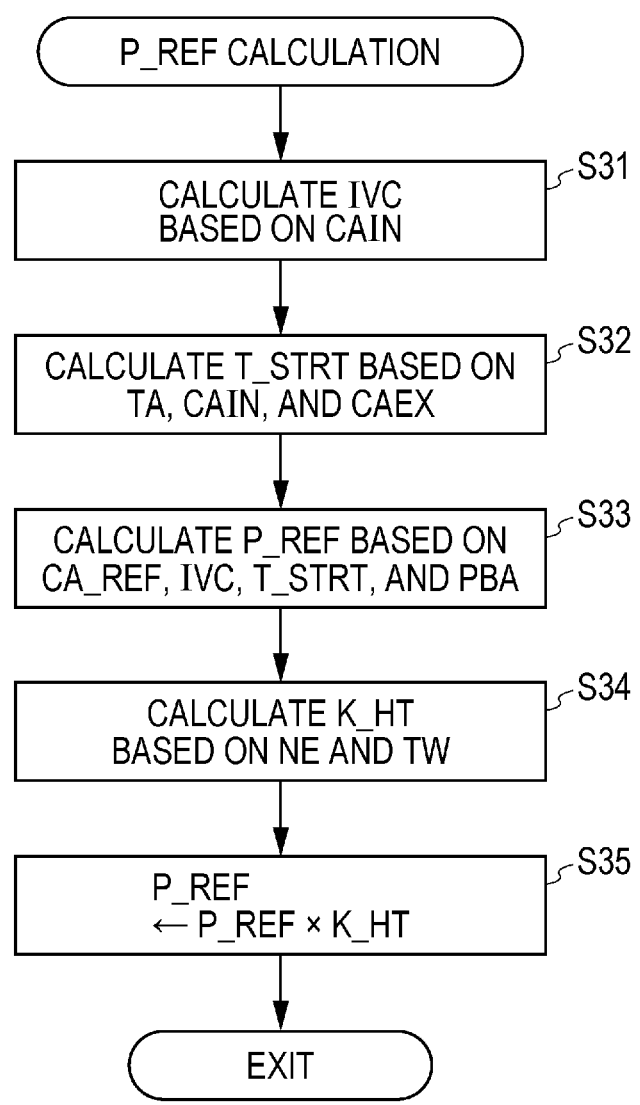
FIG. 6 demonstrates a sub-routine of calculation processing of the reference in-cylinder pressure.

Next, with reference to FIG. 6, description is provided for the calculation processing of the reference in-cylinder pressure P_REF executed in step 6 in FIG. 3. In this calculation processing, firstly in step 31, the ECU 2 calculates a valve-closing timing IVC of the intake value (hereinafter, referred to as "intake valve-closing timing") from the intake phase CAIN acquired in foregoing step 2. As is the case with the foregoing reference crank angle CA_REF, the intake valve-closing timing IVC is expressed by a crank angle with the origin (0 degrees) set at the compression TDC while an angle on the timing advance side is expressed in positive degrees.

If this intake valve-closing timing IVC is set to a crank angle during the compression stroke, the intake valve-closing timing IVC is equivalent to the crank angle at a compression start time (initial crank angle), because the compression of the mixture gas actually starts at a time when the intake valve. Meanwhile, the intake pressure PBA is equivalent to the in-cylinder pressure at the compression start time (initial in-cylinder pressure).

Next, the ECU 2 calculates an initial in-cylinder temperature T_STRT by searching a predetermined map (not illustrated) based on the intake air temperature TA, the intake phase CAIN, and the exhaust phase CAEX (step 32). Here, the initial in-cylinder temperature T_STRT is a temperature inside the cylinder 3a at the compression start time. Among the foregoing parameters, the intake phase CAIN and the exhaust phase CAEX are used to reflect an increase in the in-cylinder temperature depending on an internal EGR amount in the case where internal EGR is performed by way of valve overlap of the intake valve and the exhaust valve. Accordingly, the initial in-cylinder temperature T_STRT in the aforementioned map is set to become a higher value, as the intake air temperature TA becomes higher and as the intake phase CAIN and the exhaust phase CAEX bring about larger valve overlap.

Figure 7:
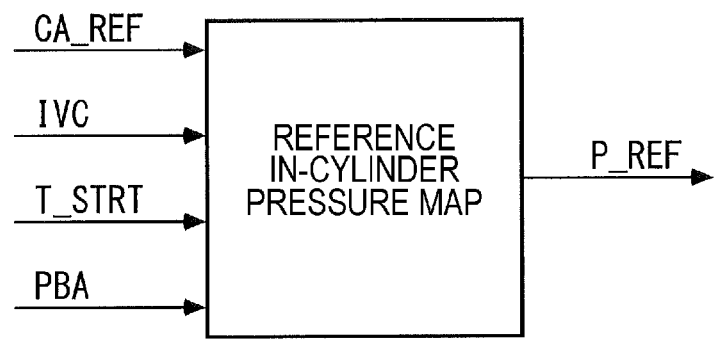
FIG. 7 is a diagram illustrating an input-output relationship of a reference in-cylinder pressure map.

In next step 33, the ECU 2 calculates the reference in-cylinder pressure P_REF by searching a reference in-cylinder pressure map illustrated in FIG. 7 based on the reference crank angle CA_REF, the intake valve-closing timing IVC, the initial in-cylinder temperature T_STRT, and the intake pressure PBA. This reference in-cylinder pressure map is explained hereinbelow.

First, the mixture gas (in-cylinder gas) charged in the cylinder 3a is explained in terms of the heat capacity ratio and the state change during the compression stroke. The heat capacity ratio κ of the mixture gas is expressed by following Formula (1) by using a specific heat capacity at constant pressure Cp and a gas constant R, and the specific heat capacity at constant pressure Cp is expressed by following Formula (2):

$$\kappa = \frac{C_p}{(C_p - R)}, \quad (1)$$

where κ denotes the heat capacity ratio of the mixture gas, $C_p$ denotes the specific heat capacity at constant pressure, and R denotes the gas constant; and $$C_p = \frac{(C_{pO_2}(T) \cdot n_{O_2} + C_{pN_2}(T) \cdot n_{N_2} + C_{pH_2O}(T) \cdot n_{H_2O} + C_{pCO_2}(T) \cdot n_{CO_2} + C_{Fuel}(T) \cdot n_{Fuel})}{(n_{O_2} + n_{N_2} + n_{H_2O} + n_{CO_2} + n_{Fuel})}, \quad (2)$$

where $C_{pX}$ denotes the specific heat capacity at constant pressure of an X component ($O_2$, $N_2$, $H_2O$, $CO_2$, and fuel) of the mixture gas, $n_X$ denotes the number of moles of the X component, and T denotes an in-cylinder temperature.

Figure 8:
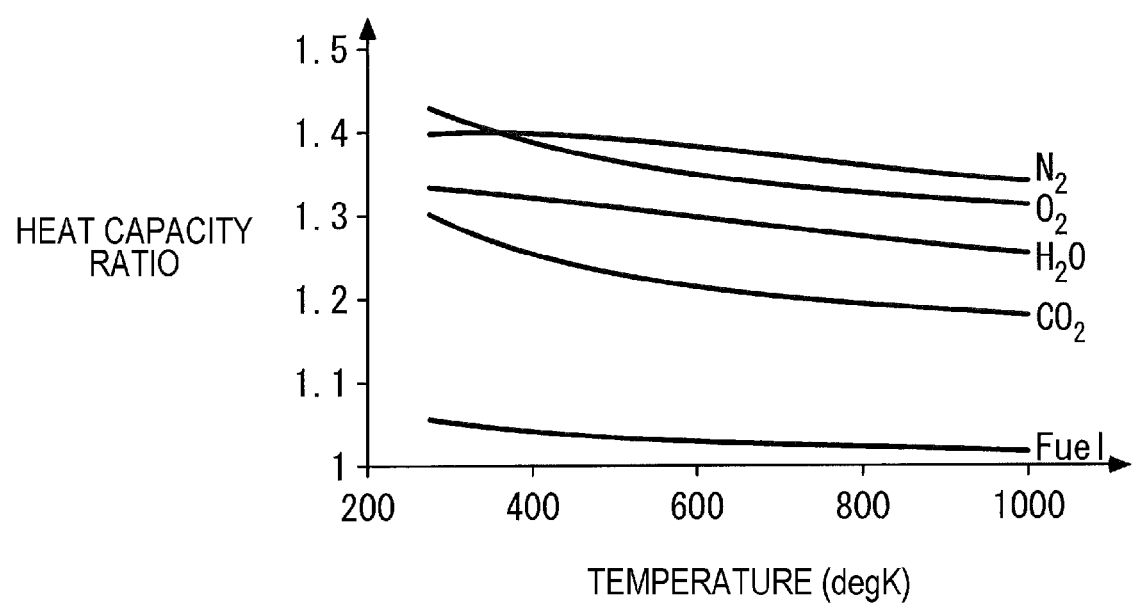
FIG. 8 is a diagram presenting temperature properties of heat capacity ratio of components of a mixture gas.
Figure 9:
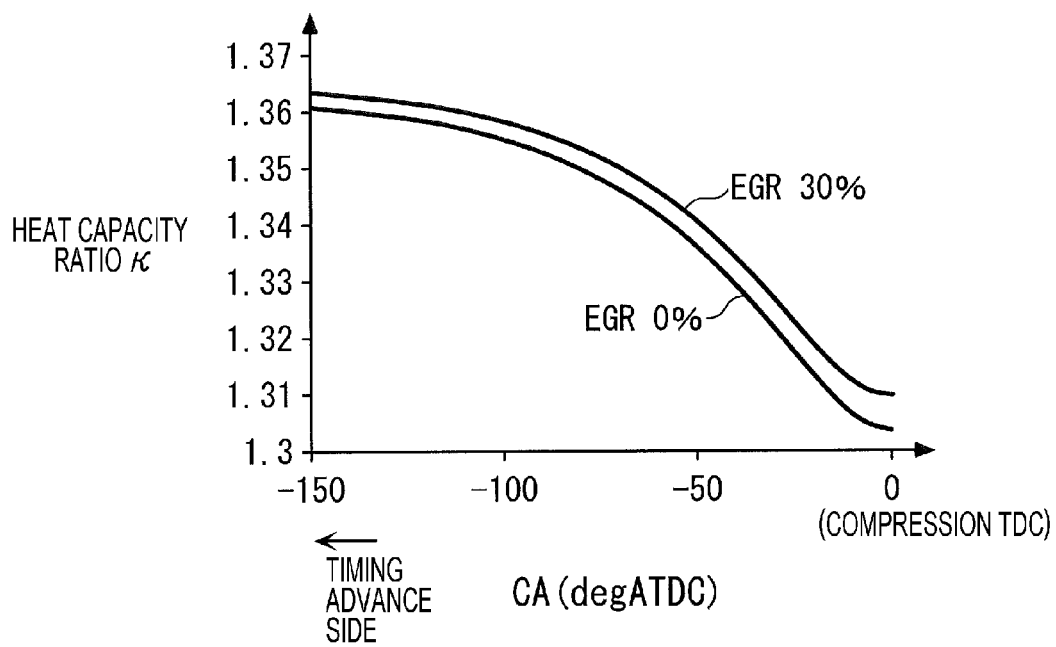
FIG. 9 is a diagram presenting examples of a relationship of the heat capacity ratio of the mixture gas to the crank angle in a compression stroke, in two cases where the mixture gas contains an EGR gas and where the mixture gas contains no EGR gas.

As presented in Formula (2), the heat capacity ratio κ of the mixture gas varies depending on the composition of the mixture gas (components and the numbers of moles of the components). In addition, as presented in FIG. 8, the heat capacity ratio of each component of the mixture gas has a temperature property in which the heat capacity ratio decreases as the temperature increases. Thus, the heat capacity ratio κ of the mixture gas containing these components also has a similar temperature property. Moreover, as presented in FIG. 9, if the mixture gas contains the EGR gas, the composition of the mixture gas is changed, and the $CO_2$ component in the EGR gas is added. Hence, the heat capacity ratio κ of the mixture gas has a property of increasing due to the addition of the $CO_2$ component.

Meanwhile, the state change of the mixture gas during the compression stroke is regarded as an adiabatic compression change, that is, a polytropic change. Thus, the in-cylinder temperature $T_a$ at the crank angle CA=a is expressed by following Formula (3):

$$T_a = T_{a-1}\left(\frac{V_{a-1}}{V_a}\right)^{(\kappa_{a-1}-1)}, \quad (3)$$

where $T_a$ denotes an in-cylinder temperature at CA=a, V denotes a cylinder volume, $V_a$ denotes a cylinder volume at CA=a, and $\kappa_a$ denotes a heat capacity ratio κ at CA=a.

As expressed by Formula (3), the in-cylinder temperature T is a function of the heat capacity ratio κ, and the heat capacity ratio κ of the mixture gas is a function of the in-cylinder temperature T as described above. Hence, in order to precisely obtain the heat capacity ratio κ and the in-cylinder temperature T, Formulas (1) and (2) and Formula (3) are iteratively calculated by mutually using a calculation result of Formula (3) and calculation results of Formulas (1) and (2), respectively. As a result, the in-cylinder temperature $T_\theta$ at the crank angle CA=the final crank angle θ (final in-cylinder temperature) is expressed by following Formula (4):

$$T_\theta = T_0\left(\frac{V_0}{V_1}\right)^{(\kappa_0-1)} \times \left(\frac{V_1}{V_2}\right)^{(\kappa_1-1)} \times \ldots \times \left(\frac{V_{\theta-1}}{V_\theta}\right)^{(\kappa_{\theta-1}-1)}, \quad (4)$$

where $T_\theta$ denotes an in-cylinder temperature at CA=θ (final in-cylinder temperature), $T_0$ denotes an initial in-cylinder temperature, $V_0$ denotes an initial cylinder volume, $V_\theta$ denotes a cylinder volume at CA=θ (final cylinder volume), $b\kappa_0$ denotes an initial heat capacity ratio of the mixture gas, and $\kappa_\theta$ denotes a heat capacity ratio of the mixture gas at CA=θ.

The in-cylinder pressure $P_a$ at the crank angle CA=a is expressed by following Formula (5), and the in-cylinder pressure $P_\theta$ at the crank angle CA=θ (final in-cylinder pressure) is expressed by following Formula (6) based on Formula (5):

$$P_a = P_{a-1}\left(\frac{V_{a-1}}{V_a}\right)^{\kappa_{a-1}}, \quad (5)$$

where $P_a$ denotes the in-cylinder pressure at CA=a; and $$P_\theta = P_0\left(\frac{V_0}{V_1}\right)^{\kappa_0} \times \left(\frac{V_1}{V_2}\right)^{\kappa_1} \times \ldots \times \left(\frac{V_{\theta-1}}{V_\theta}\right)^{\kappa_{\theta-1}}, \quad (6)$$

where $P_\theta$ denotes the in-cylinder pressure at CA=θ (final in-cylinder pressure), and $P_0$ denotes the initial in-cylinder pressure.

As expressed by Formula (6), the final in-cylinder pressure $P_\theta$ is a function of the initial in-cylinder pressure $P_0$, the initial cylinder volume $V_0$, the final cylinder volume $V_\theta$, and the iteratively-calculated heat capacity ratio κ. Then, the heat capacity ratio κ is a function of the iteratively-calculated in-cylinder temperature T, whereas the in-cylinder temperature T is a function of the initial in-cylinder temperature $T_0$ and the heat capacity ratio κ. In addition, since the cylinder volume V is uniquely obtained from the crank angle CA, the initial cylinder volume $V_0$ and the final cylinder volume $V_\theta$ can be replaced with the initial crank angle CA0 and the final crank angle CAθ, respectively.

On the basis of the above, the final in-cylinder pressure $P_\theta$ is obtained as a function of the initial in-cylinder pressure $P_0$, the initial in-cylinder temperature $T_0$, the initial crank angle CA0 and the final crank angle CAθ, provided that the composition of the mixture gas in Formula (2) is given.

The aforementioned reference in-cylinder pressure map is based on the relationships described above, and is configured as presented in FIG. 7, i.e., configured to receive, as input parameters, the intake pressure PBA, the initial in-cylinder temperature T_STRT, and the intake valve-closing timing IVC respectively corresponding to the initial in-cylinder pressure $P_0$, the initial in-cylinder temperature $T_0$, and the initial crank angle CA0, and the reference crank angle CA_REF corresponding to the final crank angle CAθ, and to obtain the reference in-cylinder pressure P_REF corresponding to the final in-cylinder pressure $P_θ$ as an output. More specifically, given various conditions of the aforementioned four input parameters, the reference in-cylinder pressure P_REF is calculated based on Formulas (1) to (6) in advance, and the reference in-cylinder pressure map is formed by mapping the calculation results to the input parameters.

As for the composition of the mixture gas, a condition where the mixture gas contains no external EGR gas, a condition of an internal EGR amount, and a condition where the mixture gas is at the stoichiometric air-fuel ratio are given. The first condition is given because an external EGR amount contained in the mixture gas through the external EGR can hardly be known due to a time lag in introduction of the external EGR gas to the cylinder 3a. In contrast, unlike the external EGR, the internal EGR introduces the internal EGR gas with almost no time lag, and thus the internal EGR amount is approximately determined by the foregoing initial conditions including the intake valve-closing timing IVC, and therefore is given as the condition.

To be more specific, the internal EGR amount is calculated by way of simulation or the like based on the intake pressure PBA, the initial in-cylinder temperature T_STRT, and the intake valve-closing timing IVC. Then, in foregoing Formula (2), the number of moles $n_{CO2}$ of the $CO_2$ component and the number of moles $n_{H2O}$ of the $H_2O$ component of the exhaust gas components are set depending on the calculated internal EGR amount, and the numbers of moles $n_X$ of the other components are set at a ratio corresponding to the stoichiometric air-fuel ratio. Given the foregoing conditions of the composition of the mixture gas, the reference in-cylinder pressure P_REF is calculated in advance based on Formulas (1) to (6) under various conditions of the foregoing four input parameters, and the reference in-cylinder pressure map is formed by mapping the calculation results to the input parameters.

Figure 10:
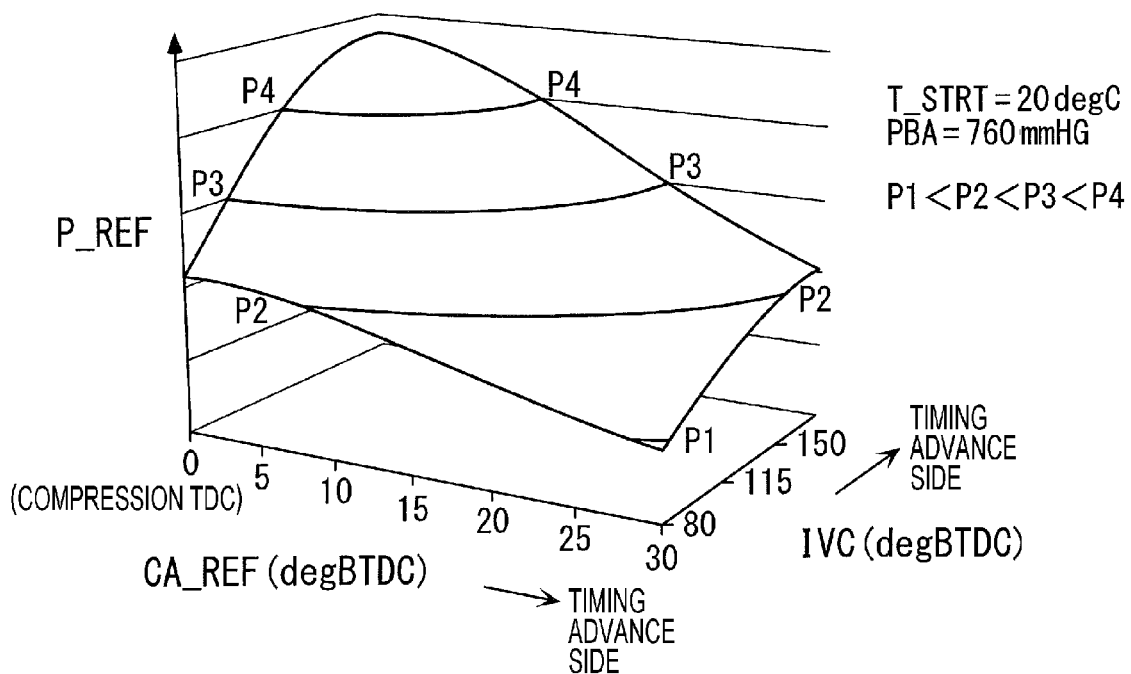
FIG. 10 is a diagram of a setting example of the reference in-cylinder pressure with respect to the reference crank angle and the intake valve-closing timing in the reference in-cylinder pressure map.
Figure 11:
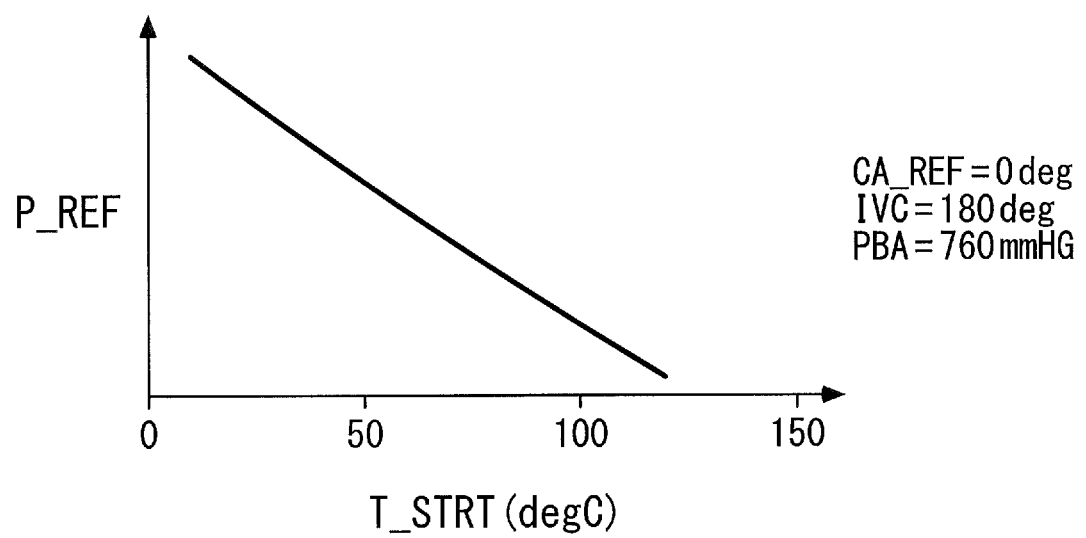
FIG. 11 is a diagram of a setting example of the reference in-cylinder pressure with respect to the initial in-cylinder temperature in the reference in-cylinder pressure map.
Figure 12:
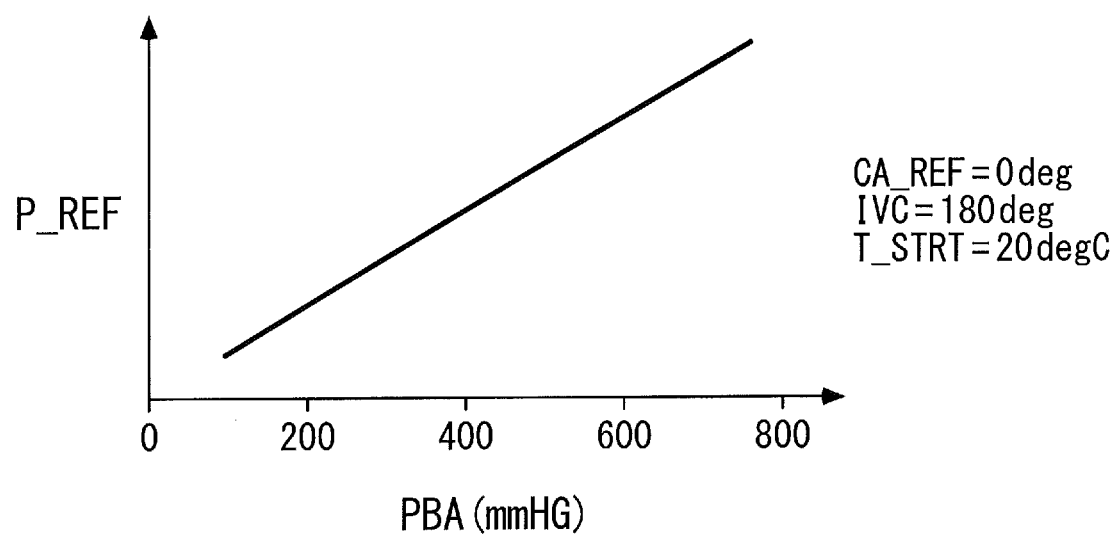
FIG. 12 is a diagram of a setting example of the reference in-cylinder pressure with respect to the intake pressure in the reference in-cylinder pressure map.

FIGS. 10 to 12 present setting examples of the reference in-cylinder pressure P_REF relative to the input parameters in the reference in-cylinder pressure map. As presented in FIG. 10, the reference in-cylinder pressure P_REF is set to become a larger value, as the value of the reference crank angle CA_REF becomes closer to 0, that is, as the reference crank angle CA_REF becomes closer to the compression TDC. In addition, the reference in-cylinder pressure P_REF is set to become a larger value, as the value of the intake valve-closing timing IVC becomes larger, that is, as the valve opening timing of the intake valve in the compression stroke becomes earlier. This is because the reference crank angle CA_REF closer to the compression TDC and the earlier valve-closing timing of the intake valve bring a longer actual compression period of the mixture gas, and result in a higher final in-cylinder pressure.

Moreover, as presented in FIG. 11, the reference in-cylinder pressure P_REF is set to become a smaller value as the initial in-cylinder temperature T_STRT becomes higher. This is because the higher initial in-cylinder temperature T_STRT makes the in-cylinder temperature higher and accordingly the heat capacity ratio κ of the mixture gas lower, which in turn lowers the increase rate of the in-cylinder pressure.

In addition, as presented in FIG. 12, the reference in-cylinder pressure P_REF is set to be proportional to the intake pressure PBA. This is because the reference in-cylinder pressure P_REF and the intake pressure PBA respectively correspond to the final in-cylinder pressure $P_θ$ and the initial in-cylinder pressure $P_0$, which have a proportional relationship therebetween (see Formula (6)).

As described above, in step 33 in FIG. 6, the ECU 2 calculates the reference in-cylinder pressure P_REF by searching the aforementioned reference in-cylinder pressure map based on the foregoing four parameters. In next step 34, the ECU 2 calculates a heat-transfer correction coefficient K_HT by searching a predetermined map based on the number of engine revolutions NE and the engine water temperature TW. This heat-transfer correction coefficient K_HT is intended to compensate for influence of heat transferred between the inside and the outside of the cylinder 3a.

Then, the ECU 2 calculates the final reference in-cylinder pressure P_REF by multiplying the reference in-cylinder pressure P_REF calculated in step 33 by the heat-transfer correction coefficient K_HT (step 35), and terminates this processing.

Hereinbelow, with reference to FIG. 13, description is provided for the calculation processing of the EGR coefficient C_EGR executed in step 7 of FIG. 3. As described above, the EGR coefficient C_EGR is defined as the slope of the EGR ratio R_EGR relative to the pressure difference ΔP between the actual in-cylinder pressure P_CPS and the reference in-cylinder pressure P_REF (see FIG. 5), and is used to calculate the EGR ratio R_EGR. Since the aforementioned slope is found to have a property of varying depending on the intake conditions and the compression conditions, the EGR coefficient C_EGR is calculated in this calculation processing.

In this calculation processing, firstly in step 41, the ECU 2 acquires the reference crank angle CA_REF, the intake valve-closing timing IVC, the initial in-cylinder temperature T_STRT, and the intake pressure PBA. These four parameters represent the aforementioned intake conditions and compression conditions, and are the same as the four input parameters for the aforementioned reference in-cylinder pressure map. Thus, the acquisition of the parameters in step 41 may be done by reading the data acquired in the calculation processing of the reference in-cylinder pressure P_REF in FIG. 6.

Figure 14:
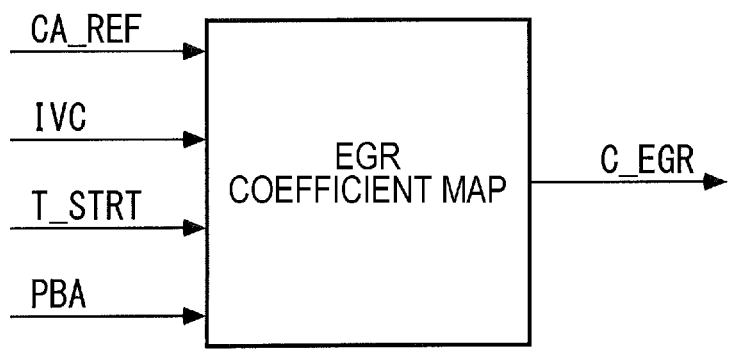
FIG. 14 is a diagram illustrating an input-output relationship of an EGR coefficient map.

Then, the ECU 2 calculates the EGR coefficient C_EGR by searching an EGR coefficient map illustrated in FIG. 14 based on the acquired four parameters (step 42), and terminates this calculation processing. This EGR coefficient map is formed by calculating the EGR coefficient C_EGR in advance based on Formulas (1) to (6) under various conditions of the foregoing four input parameters, and mapping the calculation results to the input parameters.

Figure 15:
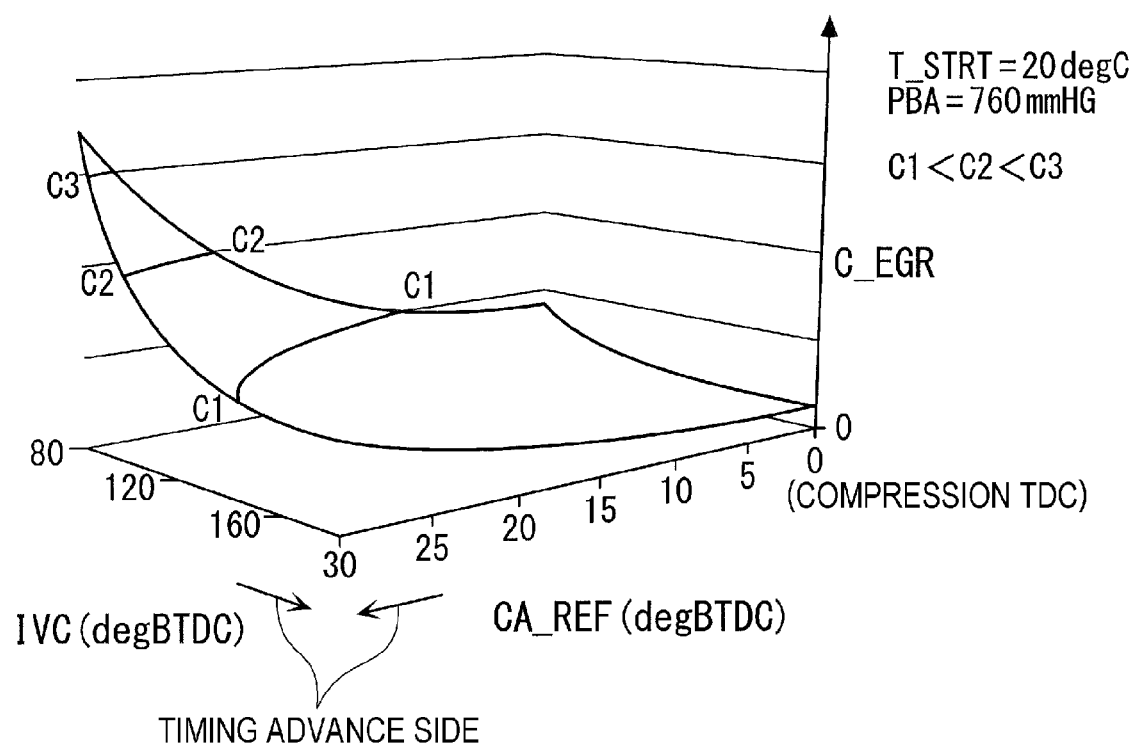
FIG. 15 is a diagram of a setting example of the EGR coefficient with respect to the reference crank angle and the intake valve-closing timing in the EGR coefficient map.
Figure 16:
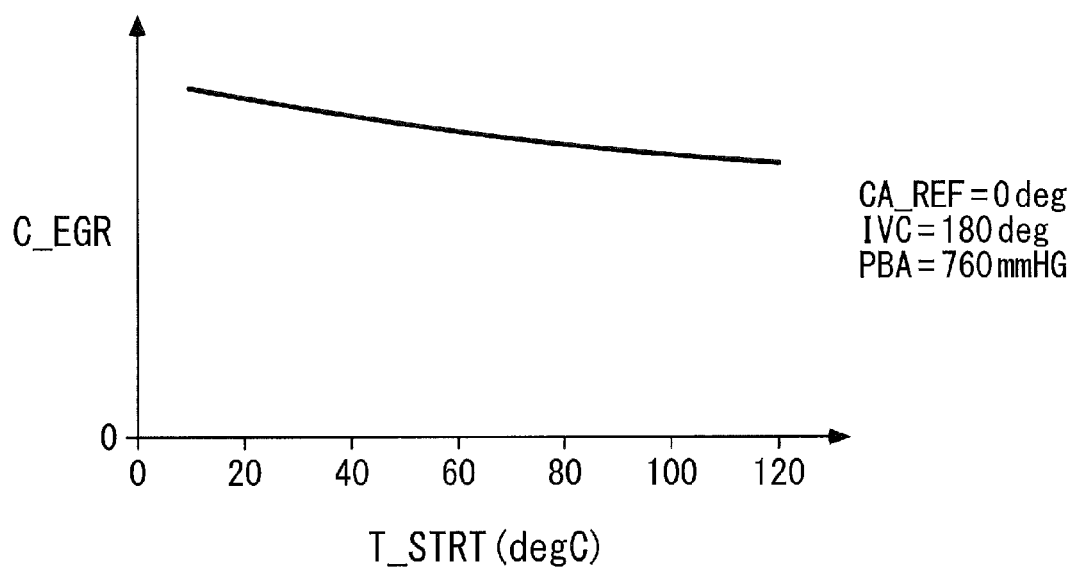
FIG. 16 is a diagram of a setting example of the EGR coefficient with respect to the initial in-cylinder temperature in the EGR coefficient map.
Figure 17:
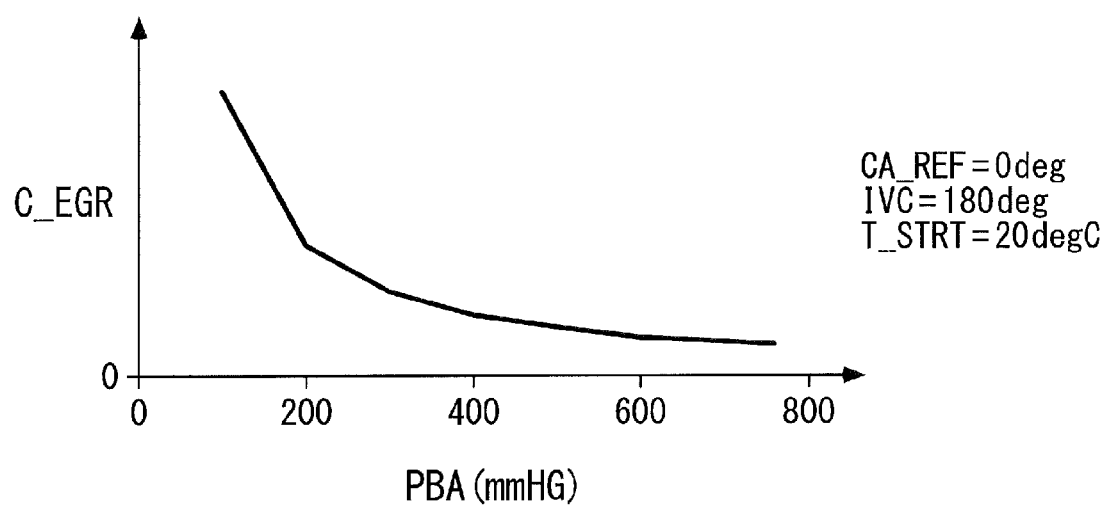
FIG. 17 is a diagram of a setting example of the EGR coefficient with respect to the intake pressure in the EGR coefficient map.

FIGS. 15 to 17 present setting examples of the EGR coefficient C_EGR relative to the input parameters in the EGR coefficient map. As presented in FIG. 15, the EGR coefficient C_EGR is set to become a smaller value, as the reference crank angle CA_REF becomes closer to the compression TDC and as the valve-closing timing of the intake valve in the compression stroke becomes earlier. This is because the reference crank angle CA_REF closer to the compression TDC and the earlier valve-closing timing of the intake valve bring a longer actual compression period of the mixture gas, which in turn results in a larger pressure difference ΔP, so that the EGR coefficient C_EGR accordingly becomes smaller.

Moreover, as presented in FIG. 16, the EGR coefficient C_EGR is set to become a smaller value as the initial in-cylinder temperature T_STRT becomes higher, for the following reason. Specifically, among the components of the mixture gas, the fuel has relatively great temperature-dependent variation in the specific heat capacity at constant pressure Cp, and therefore makes relatively great contribution to the temperature property of the heat capacity ratio κ of the mixture gas. Meanwhile, in the case where the EGR ratio R_EGR increases, the ratio of the fuel decreases accordingly, which then lowers the contribution of the fuel and consequently makes the temperature-dependent variation in the heat capacity ratio κ smaller. Thus, as the initial in-cylinder temperature T_STRT becomes higher, the variation in the heat capacity ratio κ during the compression becomes more greatly to bring a larger pressure difference ΔP, so that the EGR coefficient C_EGR accordingly becomes smaller.

Further, as presented in FIG. 17, the EGR coefficient C_EGR is set to become a smaller value as the intake pressure PBA becomes higher. This is because, as the intake pressure PBA being the initial in-cylinder pressure becomes higher, the actual in-cylinder pressure P_CPS and the pressure difference ΔP increase proportionally, and the EGR coefficient C_EGR accordingly becomes smaller.

Figure 18:
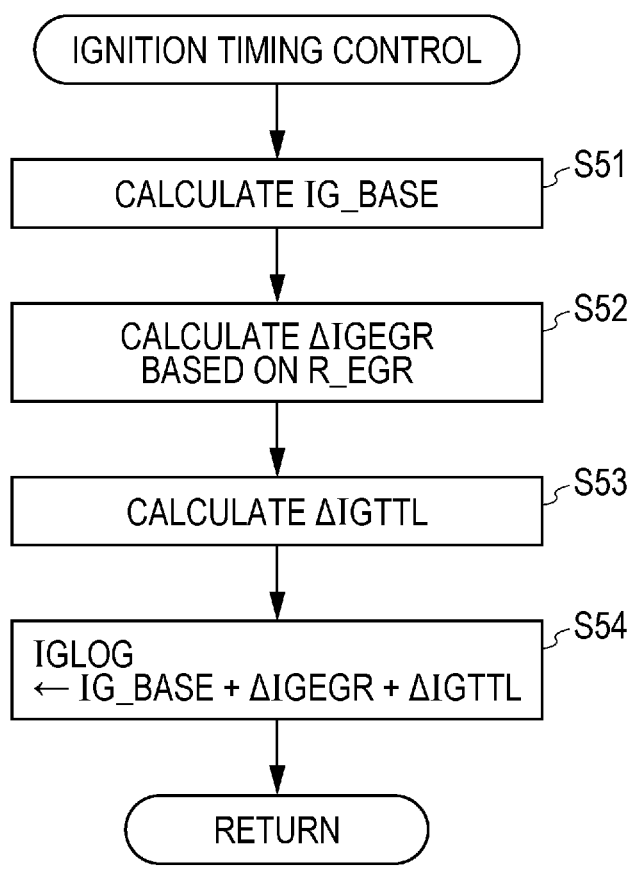
FIG. 18 is a flowchart presenting control processing of an ignition timing by using an EGR ratio.

Hereinafter, with reference to FIG. 18, description is provided for ignition timing control processing using the EGR ratio R_EGR. This control processing is executed for each of the cylinder 3a in synchronization with the generation of the TDC signal. In this control processing, firstly in step 51, the ECU 2 calculates a base ignition timing IG_BASE by searching a predetermined map (not illustrated) based on the number of engine revolutions NE and a demand torque TRQCMD. The demand torque TRQCMD herein is calculated based on the accelerator position AP and the number of engine revolutions NE.

Subsequently, the ECU 2 calculates an EGR correction amount ΔIGEGR by searching a predetermined map (not illustrated) based on the estimated EGR ratio R_EGR (step 52).

Then, the ECU 2 calculates a correction amount ΔIGTTL based on the engine water temperature TW and the number of engine revolutions NE (step 53). The correction amount ΔIGTTL is intended for correction due to factors other than the EGR ratio R_EGR.

Lastly, the ECU 2 calculates the ignition timing IGLOG by adding the EGR correction amount ΔIGEGR and the correction amount ΔIGTTL to the base ignition timing IG_BASE (step 54), and terminates the control processing.

As described above, according to this embodiment, the reference in-cylinder pressure P_REF expected to occur at the reference crank angle CA_REF is calculated based on the temperature property of the heat capacity ratio κ of the mixture gas under the conditions where the mixture gas contains no external EGR gas and is at the stoichiometric air-fuel ratio. Then, the EGR ratio of the mixture gas is calculated based on the pressure difference ΔP between the reference in-cylinder pressure P_REF and the actual in-cylinder pressure P_CPS detected at the reference crank angle CA_REF. This makes it possible to estimate the EGR ratio R_EGR while reflecting the temperature property of the heat capacity ratio κ of the mixture gas.

In addition, the reference crank angle CA_REF is the crank angle immediately before the start of combustion of the mixture gas. Such setting of the reference crank angle CA_REF may enable the actual in-cylinder pressure P_CPS to be acquired in the state where the mixture gas is yet to burn and keeps the polytropic state change, and also may ensure a large pressure difference ΔP between the actual in-cylinder pressure P_CPS and the reference in-cylinder pressure P_REF. Thus, the temperature property of the heat capacity ratio κ of the mixture gas can be advantageously reflected based on that pressure difference ΔP, so that the EGR ratio R_EGR may be estimated with high accuracy. Then, the ignition timing IGLOG may be controlled appropriately using the EGR ratio R_EGR thus estimated with high accuracy.

The actual in-cylinder pressure P_CPS being an actual pressure inside the cylinder 3a and the reference in-cylinder pressure P_REF thereof are used as the parameters to estimate the EGR ratio R_EGR. Thus, even if the EGR device 14 is the low-pressure EGR device, highly accurate estimation of the EGR ratio R_EGR may be achieved without receiving an influence of a time lag of the external EGR gas.

Moreover, the reference crank angle CA_REF is set by using the ignition timing IGLOG, the intake pressure PBA, and the number of engine revolutions NE, and thus can be appropriately set depending on the actual driving conditions of the engine 3. This enables the reference in-cylinder pressure P_REF and the actual in-cylinder pressure P_CPS at the reference crank angle CA_REF to be appropriately obtained.

In addition, if the set reference crank angle CA_REF is on the timing-retard side of 0 degrees corresponding to the compression TDC, the reference crank angle CA_REF is restricted to 0 degrees. This restriction may keep the actual in-cylinder pressure P_CPS from decreasing due to the influence of knocking and the like after the compression TDC, and therefore a pressure difference ΔP obtained between the actual in-cylinder pressure P_CPS and the reference in-cylinder pressure P_REF may be made so large that the estimation accuracy of the EGR ratio R_EGR may be kept high.

Further, the reference in-cylinder pressure P_REF can be calculated appropriately based on the reference crank angle CA_REF, the intake valve-closing timing IVC equivalent to the initial crank angle at the compression start time, the initial in-cylinder temperature T_STRT, and the intake pressure PBA equivalent to the initial in-cylinder pressure. Then, the reference in-cylinder pressure P_REF thus calculated is corrected depending on the number of engine revolutions NE and the engine water temperature TW to thus compensate for the influence of heat transferred between the inside and the outside of the cylinder 3a.

Still further, appropriate calculation of the EGR coefficient C_EGR can be achieved by reflecting the intake and compression conditions of the mixture gas based on the same four parameters (the reference crank angle CA_REF, the intake valve-closing timing IVC, the initial in-cylinder temperature T_STRT, and the intake pressure PBA) as those used to calculate the reference in-cylinder pressure P_REF. Then, the EGR coefficient C_EGR thus calculated is multiplied by the pressure difference ΔP, so that the EGR ratio R_EGR can also be estimated appropriately.

Furthermore, the in-cylinder pressure sensor 51 is formed of the pressure detection element and the amplifier circuit which are integrated into the injector 4, and thus is less susceptible to noise due to the ignition operation and noise due to injection operations by the injectors 4 of the other cylinders 3a. This enables the in-cylinder pressure sensor 51 to achieve higher detection accuracy of the actual in-cylinder pressure P_CPS, and thereby leads to further improvement of estimation accuracy of the EGR ratio R_EGR.

Figure 19:
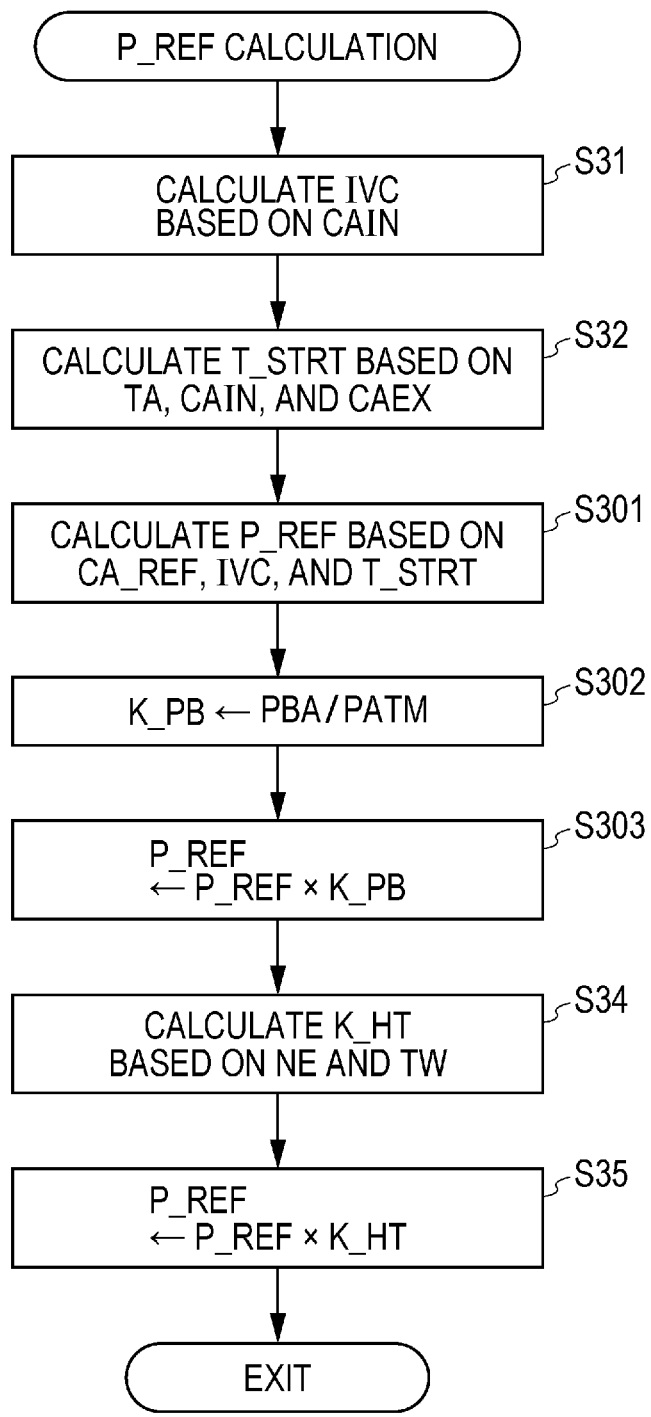
FIG. 19 demonstrates a sub-routine of calculation processing of a reference in-cylinder pressure in a modification.

Hereinafter, with reference to FIG. 19, description is provided for a modification of the calculation processing of the reference in-cylinder pressure P_REF. In this modification, since the reference in-cylinder pressure P_REF has the aforementioned proportional relationship with the intake pressure PBA (FIG. 12), the intake pressure PBA is excluded from the input parameters for the reference in-cylinder pressure map, and the map value obtained from the reference in-cylinder pressure map is corrected by using the intake pressure PBA. This calculation processing is executed instead of the processing in FIG. 6. In FIG. 19, steps involving the same processing contents as those in FIG. 6 are indicated by the same step numbers.

In this calculation processing, the ECU 2 firstly executes steps 31 and 32 which are the same as those in FIG. 6 to calculate the intake valve-closing timing IVC and the initial in-cylinder temperature T_STRT. Then, the ECU 2 calculates the reference in-cylinder pressure P_REF by searching the reference in-cylinder pressure map based on the reference crank angle CA_REF, the intake valve-closing timing IVC, and the initial in-cylinder temperature T_STRT (step 301). Note that, in this reference in-cylinder pressure map, the initial in-cylinder pressure at the compression start time is treated as a constant, which is set to a reference atmospheric pressure PATM (760 mmHg).

Then, the ECU 2 sets an intake pressure correction coefficient K_PB to a quotient of the intake pressure PBA divided by the reference atmospheric pressure PATM (step 302), and multiplies the reference in-cylinder pressure P_REF calculated in step 301 by the intake pressure correction coefficient K_PB to calculate the corrected reference in-cylinder pressure P_REF (step 303).

The following processing contents are the same as those in FIG. 6. Thus, the ECU 2 calculates the final reference in-cylinder pressure P_REF by multiplying the reference in-cylinder pressure P_REF calculated in step 303 by the heat-transfer correction coefficient K_HT calculated based on the number of engine revolutions NE and the engine water temperature TW (steps 34, 35), and terminates this calculation processing.

The modification described above may achieve calculation of the reference in-cylinder pressure P_REF comparable with that in the case of the calculation processing in FIG. 6, and also may make creation of the reference in-cylinder pressure map easier with decreased less number of input parameters, thereby reducing the workload for the map creation.

It is to be noted that the present disclosure should not be limited to the foregoing embodiment, but may be carried out in other various modes. For example, the above embodiment uses the ignition timing IGLOG, the intake pressure PBA, and the number of engine revolutions NE as the parameters used to calculate the reference crank angle CA_REF, but any other appropriate parameter may be used in addition.

Moreover, in the foregoing embodiment, the initial in-cylinder temperature T_STRT to be used to calculate the reference in-cylinder pressure P_REF and the EGR coefficient C_EGR is calculated based on the intake air temperature TA, the intake phase CAIN, and the exhaust phase CAEX. However, if the internal EGR by valve overlap of the intake and exhaust values is not performed, the intake air temperature TA may be used directly as the initial in-cylinder temperature. In addition, as the initial in-cylinder pressure, the intake pressure PBA is used, but the in-cylinder pressure PCYL detected at the compression start time by the in-cylinder pressure sensor 51 may be used instead.

The reference in-cylinder pressure P_REF is corrected based on the number of engine revolutions NE and the engine water temperature TW, but may be corrected by additionally using any other appropriate parameter considered to have influence on the heat transfer between the inside and the outside of the cylinder 3a.

Further, in the foregoing embodiment, the ignition timing control is performed based on the estimated EGR ratio R_EGR. Instead of or in addition to the ignition timing control, any other kinds of engine control based on the estimated EGR ratio R_EGR may be executed such for example as EGR control via the EGR valve 42, intake air amount control via the throttle valve 27, and fuel injection control via the injector 4.

Furthermore, the EGR device 14 is the low-pressure EGR device in the foregoing embodiment. Instead of or in addition to the low-pressure EGR device, a high-pressure EGR device may be used. Also in this case, the effects described above may be obtained as well. Then, the in-cylinder pressure sensor 51 is the built-in component in the injector 4, but may be a separate component arranged apart from the injector 4, as a matter of course.

Still further, the engine 3 is the engine for automobile in the foregoing embodiment. However, the present disclosure may be applied to other engines for different purposes, such as an outboard engine in which the crankshaft is arranged in a vertical direction, for example. Moreover, the present disclosure may be altered in details as needed without departing from the spirit of the present disclosure.

A first aspect of the present disclosure provides a control device for an internal combustion engine including an EGR device 14 that, concurrently with direct injection of a fuel into a cylinder 3a, recirculates a portion of an exhaust gas discharged to an exhaust passage 7 from the cylinder 3a back to an intake passage 6 as an external EGR gas, the controller device including: an in-cylinder pressure sensor 51 that detects a pressure inside the cylinder 3a as an in-cylinder pressure PCYL; a driving condition detector (an intake pressure sensor 56, a crank angle sensor 52, and an ECU 2) that detects driving conditions (an ignition timing IGLOG, an intake pressure PBA, and the number of engine revolutions NE) of an internal combustion engine 3; a reference crank angle setter (the ECU 2, step 5 in FIG. 3, and FIG. 4) that obtains a crank angle immediately before start of combustion of a mixture gas charged in the cylinder 3a depending on the detected driving conditions of the internal combustion engine 3, and sets the obtained crank angle as a reference crank angle CA_REF; a reference in-cylinder pressure calculator (the ECU 2, step 6 in FIG. 3, and FIG. 6) that calculates, as a reference in-cylinder pressure P_REF, a pressure inside the cylinder 3a expected to occur at the set reference crank angle CA_REF, based on a temperature property of a heat capacity ratio of the mixture gas under conditions that the mixture gas contains no external EGR gas and is at a stoichiometric air-fuel ratio; an EGR ratio estimator (the ECU 2 and steps 9 to 11 in FIG. 3) that estimates an EGR ratio R_EGR based on a pressure difference ΔP between an actual in-cylinder pressure detected at the reference crank angle CA_REF by the in-cylinder pressure sensor 51, and the calculated reference in-cylinder pressure P_REF; and a controller (the ECU 2 and FIG. 18) that controls the internal combustion engine 3 according to the estimated EGR ratio R_EGR.

In this internal combustion engine, the fuel is directly injected into the cylinder, and concurrently a portion of the exhaust gas discharged from the cylinder to the exhaust passage is recirculated as the external EGR gas into the intake passage. In the control device for an internal combustion engine according to the present disclosure, the in-cylinder pressure sensor detects the in-cylinder pressure (the pressure inside the cylinder). Then, the crank angle immediately before the start of combustion of the mixture gas obtained depending on the detected driving conditions of the internal combustion engine is set as the reference crank angle, and the pressure inside the cylinder expected to occur at this reference crank angle is calculated as the reference in-cylinder pressure. This calculation of the reference in-cylinder pressure is done based on the temperature property of the heat capacity ratio of the mixture gas under the conditions that a composition of the mixture gas contains no external EGR gas and is at the stoichiometric air-fuel ratio.

As described above, the heat capacity ratio of the mixture gas is basically determined by the composition of the mixture gas, and has the temperature property in which the heat capacity ratio varies depending on the temperature of the mixture gas. Meanwhile, in the case where the external EGR is performed, there is a time lag until the external EGR gas reaches the inside of the cylinder due to a long passage leading to the cylinder, and therefore the external EGR amount can hardly be known. Against this background, the calculation of the reference in-cylinder pressure based on the temperature property of the heat capacity ratio under the foregoing conditions of the mixture gas enables the reference in-cylinder pressure to be uniquely and appropriately obtained with the temperature property of the heat capacity ratio reflected therein.

In addition, according to the present disclosure, the in-cylinder pressure detected at the reference crank angle is obtained as the actual in-cylinder pressure, and the EGR ratio is estimated based on the pressure difference between the actual in-cylinder pressure and the reference in-cylinder pressure. This actual in-cylinder pressure reflects the actual composition of the mixture gas containing the external EGR gas, and the temperature and the heat capacity ratio depending on the actual composition of the mixture gas. Hence, it is possible to estimate the EGR ratio based on the pressure difference between the actual in-cylinder pressure and the reference in-cylinder pressure.

Moreover, the reference crank angle is the crank angle immediately before the start of combustion of the mixture gas, and is set depending on the detected driving conditions of the internal combustion engine. Such setting of the reference crank angle may enable the actual in-cylinder pressure to be acquired in the state where the mixture gas is yet to burn and keeps the polytropic state change, and also may ensure a large pressure difference between the actual in-cylinder pressure and the reference in-cylinder pressure. Thus, the EGR ratio may be estimated with high accuracy while advantageously reflecting the temperature property of the heat capacity ratio based on this pressure difference. Then, the control of the internal combustion engine according to the EGR ratio thus accurately estimated may achieve the appropriate control of the internal combustion engine.

A second aspect of the present disclosure, which is based on the control device for an internal combustion engine according to the first aspect, may be preferably characterized in that the EGR device 14 recirculates the external ERG gas from a downstream side of a turbine 23 of a supercharger (a turbocharger 13) in the exhaust passage 7 back to an upstream side of a compressor 21 of the supercharger in the intake passage 6.

The EGR device configured as described above is what is termed as a low-pressure EGR device, and has such a tendency that the external EGR gas reaches the cylinder with a long time lag due to a relatively long passage through which the external EGR gas needs to flow. In the present disclosure, the EGR ratio is estimated by using, as parameters, the actual in-cylinder pressure that is an actual pressure inside the cylinder, and its reference in-cylinder pressure as described above. Thus, even in the case of the low-pressure EGR device, the EGR ratio may be estimated with high accuracy without being influenced by the time lag of the external EGR gas, which may produce the effect of the present disclosure effectively in particular.

A third aspect of the present disclosure, which is based on the control device for an internal combustion engine according to the first or second aspect, may be preferably characterized in that the driving condition detector detects an ignition timing IGLOG, a pressure of intake air to be taken in the cylinder 3a (intake pressure PBA), and the number of revolutions NE of the internal combustion engine 3 as the driving conditions of the internal combustion engine 3, and the reference crank angle setter sets the reference crank angle CA_REF depending on the ignition timing IGLOG, the pressure of intake air, and the number of revolutions NE of the internal combustion engine 3 thus detected (FIG. 4).

As described above, the reference crank angle is set to the crank angle immediately before the start of combustion of the mixture gas. Meanwhile, the combustion start timing of the mixture gas is directly influenced by the ignition timing, varies depending on the pressure of intake air, and also varies, if expressed by using a crank angle, depending on the number of revolutions of the internal combustion engine. With this configuration, the reference crank angle is set depending on these three detected parameters. This may enable appropriate setting of the reference crank angle depending on the actual driving conditions of the internal combustion engine with the result that the reference in-cylinder pressure and the actual in-cylinder pressure at the reference crank angle may be appropriately obtained. Here, the "detection" of various parameters in the present application includes not only directly detecting a parameter by means of a sensor or the like, but also calculating or estimating the parameter through an arithmetic operation, for example.

A fourth aspect of the present disclosure, which is based on the control device for an internal combustion engine according to the third aspect, may be preferably characterized in that, if the set reference crank angle CA_REF is on a timing-retard side of a compression TDC, the reference crank angle setter restricts the reference crank angle CA_REF to a crank angle corresponding to the compression TDC (0 degrees) (steps 23 and 24 in FIG. 4).

For example, as illustrated in FIG. 20, when the ignition timing is on the timing-advance side of the compression TDC and the combustion start timing of the mixture gas is on the timing-retard side of the compression TDC, the actual in-cylinder pressure may decrease (a section indicated by an arrow A in FIG. 20) between the compression TDC and the combustion start mainly due to an influence of knocking. In this case, if the reference crank angle is set on the timing-retard side of the compression TDC, the actual in-cylinder pressure detected at the reference crank angle may decrease, and a large pressure difference may not be obtained between the actual in-cylinder pressure and the reference in-cylinder pressure. As a result, the estimation accuracy of the EGR ratio based on the pressure difference may be lowered.

With the above configuration, if the reference crank angle set as described above is on the timing-retard side of the compression TDC, the reference crank angle is restricted to the crank angle corresponding to the compression TDC. This restriction may keep the actual in-cylinder pressure from decreasing due to the influence of knocking and the like after the compression TDC, and therefore such a large pressure difference may be obtained that the estimation accuracy of the EGR ratio may be kept high.

A fifth aspect of the present disclosure, which is based on the control device for an internal combustion engine according to any one of the first to fourth aspects, may further include an initial crank angle acquirer (an intake phase sensor 53 and the ECU 2) that acquires, as an initial crank angle (intake valve-closing timing IVC), the crank angle at a compression start time when the mixture gas starts to be compressed in a compression stroke; an initial in-cylinder temperature acquirer (an intake air temperature sensor 57, an intake phase sensor 53, an exhaust phase sensor 54, the ECU 2, and step 32 in FIG. 6) that acquires, as an initial in-cylinder temperature T_STRT, a temperature inside the cylinder 3a at the compression start time; and an initial in-cylinder pressure acquirer (an intake pressure sensor 56) that acquires, as initial in-cylinder pressure (intake pressure PBA), the pressure inside the cylinder 3a at the compression start time. The reference in-cylinder pressure calculator may calculate the reference in-cylinder pressure P_REF based on the temperature property of the heat capacity ratio of the mixture gas, depending on the reference crank angle CA_REF, and also the initial crank angle, the initial in-cylinder temperature T_STRT, and the initial in-cylinder pressure thus acquired (step 33 in FIG. 6).

The reference in-cylinder pressure is the in-cylinder pressure expected to occur at the reference crank angle corresponding to a time point immediately before the start of combustion of the mixture gas. Thus, the reference in-cylinder pressure varies depending on the reference crank angle and also varies depending on the compression start timing of the mixture gas, and the temperature and the pressure of the mixture gas at the compression start time. With this configuration, the reference in-cylinder pressure is calculated based on the reference crank angle, as well as the initial crank angle, the initial in-cylinder temperature, and the initial in-cylinder pressure at the compression start time. Thus, the reference in-cylinder pressure may be calculated appropriately.

A sixth aspect of the present disclosure, which is based on the control device for an internal combustion engine according to the fifth aspect, may further include a number of revolutions detector (a crank angle sensor 52) that detects the number of revolutions NE of the internal combustion engine, and a cooling water temperature detector (a water temperature sensor 59) that detects a temperature TW of cooling water cooling the internal combustion engine. The reference in-cylinder pressure calculator may correct the reference in-cylinder pressure P_REF depending on the number of revolutions NE of the internal combustion engine 3 and the temperature TW of the cooling water thus detected (steps 34, 35 in FIG. 6).

With this configuration, the correction of the reference in-cylinder pressure depending on the detected number of revolutions of the internal combustion engine and the detected temperature of the cooling water may compensate for influence of heat transferred between the inside and the outside of the engine.

Figure 13:
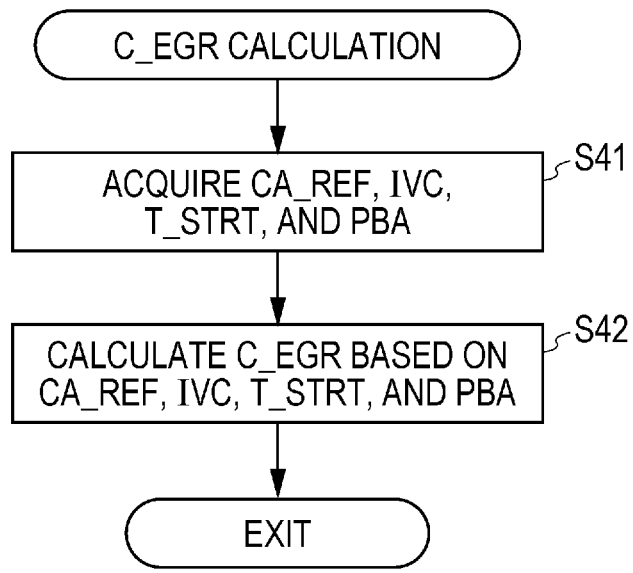
FIG. 13 demonstrates a sub-routine of calculation processing of an EGR coefficient.

A seventh aspect of the present disclosure, which is based on the control device for an internal combustion engine according to the fifth or sixth aspect, may preferably be characterized in that the EGR ratio estimator calculates an EGR coefficient C_EGR indicative of a slope of the EGR ratio R_EGR relative to the pressure difference ΔP, based on the temperature property of the heat capacity ratio of the mixture gas, depending on the reference crank angle CA_REF, the initial crank angle, the initial in-cylinder temperature T_STRT, and the initial in-cylinder pressure, and calculates the EGR ratio R_EGR by multiplying the pressure difference ΔP by the calculated EGR coefficient C_EGR (steps 7, 11 in FIG. 3 and FIG. 13).

The pressure difference between the actual in-cylinder pressure and the reference in-cylinder pressure and the EGR ratio have a proportional relationship therebetween, and are found to have a property in which a proportional constant (slope) thereof varies depending on the intake conditions and the compression conditions. With this configuration, in estimation of the EGR ratio, the EGR coefficient indicative of the slope of the EGR ratio relative to the pressure difference is firstly calculated depending on the reference crank angle, the initial crank angle, the initial in-cylinder temperature, and the initial in-cylinder pressure. In this way, it is possible to appropriately calculate the EGR coefficient while reflecting the intake and compression conditions of the mixture gas by using the same parameters as those used for calculation of the reference in-cylinder pressure. Then, the pressure difference is multiplied by EGR coefficient thus calculated, so that the EGR ratio may be estimated with high accuracy.

A eight aspect of the present disclosure, which is based on the control device for an internal combustion engine according to any one of the first to seventh aspects, may be preferably characterized in that the in-cylinder pressure sensor 51 includes a pressure detection element that detects the in-cylinder pressure, and an amplifier circuit that amplifies and outputs a signal outputted from the pressure detection element, and the pressure detection element and the amplifier circuit are integrated into a fuel injection value 4 that injects the fuel into the cylinder 3a.

The in-cylinder pressure sensor configured as described above is formed of the pressure detection element and the amplifier circuit integrated into the fuel injection valve, and thus may be less susceptible to noise due to an ignition operation and noise due to injection operations by the fuel injection values of the other cylinders. This enables the in-cylinder pressure sensor to achieve higher detection accuracy of the actual in-cylinder pressure, and thereby leads to further improvement of estimation accuracy of the EGR ratio.

Obviously, numerous modifications and variations of the present invention are possible in light of the above teachings. It is therefore to be understood that within the scope of the appended claims, the invention may be practiced otherwise than as specifically described herein.

What is claimed is:

1. A control device for an internal combustion engine including an exhaust gas recirculation (EGR) device that, concurrently with direct injection of a fuel into a cylinder, recirculates a portion of an exhaust gas discharged to an exhaust passage from the cylinder back to an intake passage as an external EGR gas, the control device comprising:
   an in-cylinder pressure sensor that detects a pressure inside the cylinder as an in-cylinder pressure;
   a driving condition detector that detects a driving condition of the internal combustion engine;
   a reference crank angle setter that obtains a crank angle immediately before start of combustion of a mixture gas charged in the cylinder depending on the detected driving condition of the internal combustion engine, and sets the obtained crank angle as a reference crank angle;
   a reference in-cylinder pressure calculator that calculates, as a reference in-cylinder pressure, a pressure inside the cylinder expected to occur at the set reference crank angle, based on a temperature property of a heat capacity ratio of the mixture gas under conditions that the mixture gas contains no external EGR gas and is at a stoichiometric air-fuel ratio;

an EGR ratio estimator that estimates an EGR ratio based on a pressure difference between an actual in-cylinder pressure detected at the reference crank angle by the in-cylinder pressure sensor, and the calculated reference in-cylinder pressure; and a controller that controls the internal combustion engine according to the estimated EGR ratio.

2. The control device according to claim 1, wherein the EGR device recirculates the external ERG gas from a downstream side of a turbine of a supercharger in the exhaust passage back to an upstream side of a compressor of the supercharger in the intake passage.

3. The control device according to claim 1, wherein
the driving condition detector detects an ignition timing, a pressure of intake air to be taken in the cylinder, and the number of revolutions of the internal combustion engine as the driving conditions of the internal combustion engine, and the reference crank angle setter sets the reference crank angle based on the ignition timing, the pressure of intake air, and the number of revolutions of the internal combustion engine thus detected.

4. The control device according to claim 3, wherein, if the set reference crank angle is on a timing-retard side of a compression TDC, the reference crank angle setter restricts the reference crank angle to a crank angle corresponding to the compression TDC.

5. The control device according to claim 1, further comprising:

an initial crank angle acquirer that acquires, as an initial crank angle, the crank angle at a compression start time when the mixture gas starts to be compressed in a compression stroke;

an initial in-cylinder temperature acquirer that acquires, as an initial in-cylinder temperature, a temperature inside the cylinder at the compression start time; and an initial in-cylinder pressure acquirer that acquires, as initial in-cylinder pressure, the pressure inside the cylinder at the compression start time, wherein the reference in-cylinder pressure calculator calculates the reference in-cylinder pressure based on the temperature property of the heat capacity ratio of the mixture gas, depending on the reference crank angle, and also the initial crank angle, the initial in-cylinder temperature, and the initial in-cylinder pressure thus acquired.

6. The control device according to claim 5, further comprising:

a number of revolutions detector that detects the number of revolutions of the internal combustion engine; and a cooling water temperature detector that detects a temperature of cooling water cooling the internal combustion engine, wherein the reference in-cylinder pressure calculator corrects the reference in-cylinder pressure depending on the number of revolutions of the internal combustion engine and the temperature of the cooling water thus detected.

7. The control device according to claim 5, wherein
the EGR ratio estimator calculates an EGR coefficient indicative of a slope of the EGR ratio relative to the pressure difference, based on the temperature property of the heat capacity ratio of the mixture gas, depending on the reference crank angle, the initial crank angle, the initial in-cylinder temperature, and the initial in-cylinder pressure, and calculates the EGR ratio by multiplying the pressure difference by the calculated EGR coefficient.

8. The control device according to claim 1, wherein
the in-cylinder pressure sensor comprises a pressure detection element that detects the in-cylinder pressure, and an amplifier circuit that amplifies and outputs a signal outputted from the pressure detection element, and the pressure detection element and the amplifier circuit are integrated into a fuel injection value that injects the fuel into the cylinder.

9. A control device for an internal combustion engine, the control device comprising:

a cylinder pressure sensor to detect a cylinder pressure inside a cylinder into which fuel is directly injected;

a driving condition detector to detect a driving condition in the internal combustion engine;

a reference crank angle setter to calculate, according to the driving condition detected by the driving condition detector, a reference crank angle immediately before which mixture gas starts combusting in the cylinder;

a reference cylinder pressure calculator to calculate a reference cylinder pressure in the cylinder at the reference crank angle based on temperature characteristics of a heat capacity ratio of the mixture gas under a condition that the mixture gas contains no external exhaust gas recirculation (EGR) gas and that the mixture gas has a stoichiometric air-fuel ratio;

an EGR ratio estimator to calculate an EGR ratio based on a pressure difference between the reference cylinder pressure and the cylinder pressure detected by the cylinder pressure sensor at the reference crank angle; and a controller to control the internal combustion engine according to the EGR ratio.

10. The control device according to claim 9, wherein the internal combustion engine includes an EGR device that, concurrently with direct injection of the fuel into the cylinder, recirculates a portion of an exhaust gas discharged to an exhaust passage from the cylinder back to an intake passage as the external EGR gas.

11. The control device according to claim 10, wherein the EGR device recirculates the external ERG gas from a downstream side of a turbine of a supercharger in the exhaust passage back to an upstream side of a compressor of the supercharger in the intake passage.

12. The control device according to claim 9, wherein
the driving condition detector detects an ignition timing, a pressure of intake air to be taken in the cylinder, and the number of revolutions of the internal combustion engine as the driving condition of the internal combustion engine, and the reference crank angle setter sets the reference crank angle based on the ignition timing, the pressure of intake air, and the number of revolutions of the internal combustion engine thus detected.

13. The control device according to claim 12, wherein, if the set reference crank angle is on a timing-retard side of a compression TDC, the reference crank angle setter restricts the reference crank angle to a crank angle corresponding to the compression TDC.

14. The control device according to claim 9, further comprising:

an initial crank angle acquirer that acquires, as an initial crank angle, a crank angle at a compression start time when the mixture gas starts to be compressed in a compression stroke;

an initial cylinder temperature acquirer that acquires, as an initial cylinder temperature, a temperature inside the cylinder at the compression start time; and an initial cylinder pressure acquirer that acquires, as initial cylinder pressure, the pressure inside the cylinder at the compression start time, wherein the reference cylinder pressure calculator calculates the reference cylinder pressure based on the temperature characteristics of the heat capacity ratio of the mixture gas, depending on the reference crank angle, and also the initial crank angle, the initial cylinder temperature, and the initial cylinder pressure thus acquired.

15. The control device according to claim 14, further comprising:

a number of revolutions detector that detects the number of revolutions of the internal combustion engine; and a cooling water temperature detector that detects a temperature of cooling water cooling the internal combustion engine, wherein the reference cylinder pressure calculator corrects the reference cylinder pressure depending on the number of revolutions of the internal combustion engine and the temperature of the cooling water thus detected.

16. The control device according to claim 14, wherein the EGR ratio estimator calculates an EGR coefficient indicative of a slope of the EGR ratio relative to the pressure difference, based on the temperature characteristics of the heat capacity ratio of the mixture gas, depending on the reference crank angle, the initial crank angle, the initial cylinder temperature, and the initial cylinder pressure, and calculates the EGR ratio by multiplying the pressure difference by the calculated EGR coefficient.

17. The control device according to claim 9, wherein the cylinder pressure sensor comprises a pressure detection element that detects the cylinder pressure, and an amplifier circuit that amplifies and outputs a signal outputted from the pressure detection element, and the pressure detection element and the amplifier circuit are integrated into a fuel injection value that injects the fuel into the cylinder.

\* \* \* \* \*